US009379546B2

(12) United States Patent
Li

(10) Patent No.: US 9,379,546 B2
(45) Date of Patent: Jun. 28, 2016

(54) VECTOR CONTROL OF GRID-CONNECTED POWER ELECTRONIC CONVERTER USING ARTIFICIAL NEURAL NETWORKS

(71) Applicant: The Board of Trustees of The University of Alabama, Tuscaloosa, AL (US)

(72) Inventor: Shuhui Li, Northport, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 185 days.

(21) Appl. No.: 14/299,515

(22) Filed: Jun. 9, 2014

(65) Prior Publication Data
US 2014/0362617 A1    Dec. 11, 2014

Related U.S. Application Data

(60) Provisional application No. 61/832,416, filed on Jun. 7, 2013.

(51) Int. Cl.
*H02M 5/45*     (2006.01)
*H02J 3/00*     (2006.01)
*H02M 7/5387*   (2007.01)

(52) U.S. Cl.
CPC .............. *H02J 3/00* (2013.01); *H02M 7/53875* (2013.01); *H02M 2007/53876* (2013.01); *Y10T 307/549* (2015.04)

(58) Field of Classification Search
CPC ..................... H02M 7/53871; H02M 7/53875; H02M 5/458; H02M 2007/53876; H02J 3/00; H02P 9/04
See application file for complete search history.

(56) References Cited

U.S. PATENT DOCUMENTS

| 8,030,791 B2 * | 10/2011 | Lang ................... H02M 5/4505 290/43 |
| 8,577,508 B2 * | 11/2013 | Li .......................... F03D 9/003 290/2 |
| 2011/0089693 A1 * | 4/2011 | Nasiri ................... F03D 7/0272 290/44 |
| 2012/0056602 A1 * | 3/2012 | Li ............................ H02P 9/48 322/89 |
| 2012/0112551 A1 | 5/2012 | Li et al. |

\* cited by examiner

*Primary Examiner* — Matthew Nguyen
(74) *Attorney, Agent, or Firm* — Meunier Carlin & Curfman LLC

(57) ABSTRACT

Systems and methods for performing vector control of grid-connected power electronic converters using a neural network are described herein. Optionally, the grid-connected power electronic converters can be used in renewable and electric power system applications. In order to improve performance and stability under disturbance conditions, integrals of error signals can be introduced as inputs to the neural network. Alternatively or additionally, grid disturbance voltage can be introduced to an output of a trained neural network.

20 Claims, 19 Drawing Sheets

US 9,379,546 B2

VECTOR CONTROL OF GRID-CONNECTED POWER ELECTRONIC CONVERTER USING ARTIFICIAL NEURAL NETWORKS

This application claims priority to U.S. Provisional Application No. 61/832,416, filed Jun. 7, 2013, the contents of which are expressly incorporated herein by reference in its entirety.

BACKGROUND

In renewable and electric power system applications, a three-phase grid-connected DC/AC voltage-source pulse-width modulation ("PWM") converter can be employed at the interface between the DC and AC systems. Referring now to FIG. 1, a block diagram illustrating grid-connected converters ("GCC") used in a micro-grid to connect distributed energy resources is shown. Typical converter configurations containing the GCCs include: 1) a dc/dc/ac converter 102 for solar, battery and fuel cell applications, 2) a dc/ac converter 104 for static synchronous compensator ("STATCOM") applications, and 3) an ac/dc/ac converter 106 for wind power and HVDC applications. Conventionally, these types of converters are controlled using standard decoupled d-q vector control techniques.

Notwithstanding its merits, recent studies indicate that the conventional vector control strategy is inherently limited, particularly when facing uncertainties. For instance, it has been shown that wind farms periodically experience a high degree of imbalance and harmonic distortions, which have resulted in numerous trips. Additionally, tuning proportional-integral ("PI") controller parameters for the standard control techniques in STATCOM applications is difficult. Accordingly, significant challenges have been identified in the development of microgrids based on conventional vector control technologies.

SUMMARY

Systems and methods for performing vector control of grid-connected power electronic converters using a neural network are described herein. Optionally, the grid-connected power electronic converters can be used in renewable and electric power system applications. In order to improve performance and stability under disturbance conditions, integrals of error signals can be introduced as inputs to the neural network. Alternatively or additionally, grid disturbance voltage can be introduced to an output of a trained neural network.

An example method for controlling a grid-connected energy source or energy system can include providing a grid-connected pulse-width modulated ("PWM") converter operably connected between an electrical grid and an energy source and providing a control system operably connected to the grid-connected PWM converter. The control system can include a nested-loop controller and an action neural network, where a d-axis loop of the nested-loop controller controls real power and a q-axis loop of the nested-loop controller controls reactive power. The method can further include receiving a plurality of inputs at the action neural network. The inputs can include a d-axis current ($i_d$), a q-axis current ($i_q$), a d-axis error signal (e.g., the difference between $i_d$ and a reference d-axis current ($i_d^*$)), a q-axis error signal (e.g., the difference between $i_q$ and a reference q-axis current ($i_q^*$)), an integral of the d-axis error signal and an integral of the q-axis error signal. In addition, the method can include outputting a compensating dq-control voltage from the action neural network and receiving the compensating dq-control voltage in the nested-loop controller. The action neural network can be configured to optimize the compensating dq-control voltage based on the plurality of inputs. Additionally, the control system can be configured to control the grid-connected PWM converter using the compensating dq-control voltage. Optionally, the control system can be configured to control the grid-connected PWM converter under distorted conditions using the compensating dq-control voltage.

An example system for controlling a grid-connected energy source or energy system can include a grid-connected PWM converter operably connected between an electrical grid and an energy source and a control system operably connected to the grid-connected PWM converter. The control system can include a nested-loop controller and an action neural network, where a d-axis loop of the nested-loop controller controls real power and a q-axis loop of the nested-loop controller controls reactive power. The action neural network can be configured to receive a plurality of inputs at the action neural network. The inputs can include a d-axis current ($i_d$), a q-axis current ($i_q$), a d-axis error signal (e.g., the difference between $i_d$ and a reference d-axis current ($i_d^*$)), a q-axis error signal (e.g., the difference between $i_q$ and a reference q-axis current ($i_q^*$)), an integral of the d-axis error signal and an integral of the q-axis error signal. In addition, the action neural network can be configured to output a compensating dq-control voltage, which is received in the nested-loop controller. The action neural network can be configured to optimize the compensating dq-control voltage based on the plurality of inputs. Additionally, the control system can be configured to control the grid-connected PWM converter using the compensating dq-control voltage. Optionally, the control system can be configured to control the grid-connected PWM converter under distorted conditions using the compensating dq-control voltage.

Optionally, the grid-connected PWM converter can be operably connected between the electrical grid and a DC link capacitor.

Optionally, the integrals of the d-axis and the q-axis error signals can provide the action neural network with a history of the d-axis and q-axis error signals, respectively.

Optionally, the action neural network can be configured to implement a dynamic programming ("DP") algorithm.

Additionally, the action neural network can optionally be trained to minimize a cost function of the DP algorithm using a backpropagation through time ("BPTT") algorithm. For example, the training can include randomly generating an initial state comprising an initial dq-current, randomly generating a sample reference dq-current, unrolling a trajectory of the control system from the initial state and training the action neural network based on the cost function of the DP algorithm and the BPTT algorithm.

The action neural network can optionally include a multi-layer perceptron including a plurality of input nodes, a plurality of hidden layer nodes and a plurality of output nodes. For example, the multi-layer perceptron can optionally include six input nodes and two output nodes. Alternatively or additionally, each of the nodes can optionally be configured to implement a hyperbolic tangent function.

Optionally, the grid-connected PWM converter can be at least one of a DC/AC converter, a DC/DC/AC converter and an AC/DC/AC converter. Alternatively or additionally, the energy source can optionally be at least one of a solar cell or array, a battery, a fuel cell, a wind turbine generator and another electrical grid.

Optionally, the grid-connected PWM converter can be operably connected to the electrical grid in a three-phase or single-phase connection.

Another example method for controlling a grid-connected energy system can include providing a first grid-connected PWM converter operably connected between a first electrical grid and a DC link capacitor, providing a second grid-connected PWM converter operably connected between a second electrical grid and the DC link capacitor and providing a control system operably connected to at least one of first and second the grid-connected PWM converters. The control system can include a nested-loop controller and an action neural network, where a d-axis loop of the nested-loop controller controls real power and a q-axis loop of the nested-loop controller controls reactive power. The method can further include receiving a plurality of inputs at the action neural network. The inputs can include a d-axis current ($i_d$), a q-axis current ($i_q$), a d-axis error signal (e.g., the difference between $i_d$ and a reference d-axis current ($i_d^*$)), a q-axis error signal (e.g., the difference between $i_q$ and a reference q-axis current ($i_q^*$)), an integral of the d-axis error signal and an integral of the q-axis error signal. In addition, the method can include outputting a compensating dq-control voltage from the action neural network and receiving the compensating dq-control voltage in the nested-loop controller. The action neural network can be configured to optimize the compensating dq-control voltage based on the plurality of inputs. Additionally, the control system can be configured to control the at least one of first and second the grid-connected PWM converters using the compensating dq-control voltage.

Another example system for controlling a grid-connected energy system can include a first grid-connected PWM converter operably connected between a first electrical grid and a DC link capacitor, a second grid-connected PWM converter operably connected between a second electrical grid and the DC link capacitor and a control system operably connected to at least one of first and second the grid-connected PWM converters. The control system can include a nested-loop controller and an action neural network, where a d-axis loop of the nested-loop controller controls real power and a q-axis loop of the nested-loop controller controls reactive power. The action neural network can be configured to receive a plurality of inputs at the action neural network. The inputs can include a d-axis current ($i_d$), a q-axis current ($i_q$), a d-axis error signal (e.g., the difference between $i_d$ and a reference d-axis current ($i_d^*$)), a q-axis error signal (e.g., the difference between $i_q$ and a reference q-axis current ($i_q^*$)), an integral of the d-axis error signal and an integral of the q-axis error signal. In addition, the action neural network can be configured to output a compensating dq-control voltage, which is received at the nested-loop controller. The action neural network can be configured to optimize the compensating dq-control voltage based on the plurality of inputs. Additionally, the control system can be configured to control at least one of first and second the grid-connected PWM converters using the compensating dq-control voltage.

It should be understood that the above-described subject matter may also be implemented as an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for providing vector control of a grid-connected power electronic converters using an artificial neural network, it will become evident to those skilled in the art that the implementations are not limited thereto.

Figure 2:
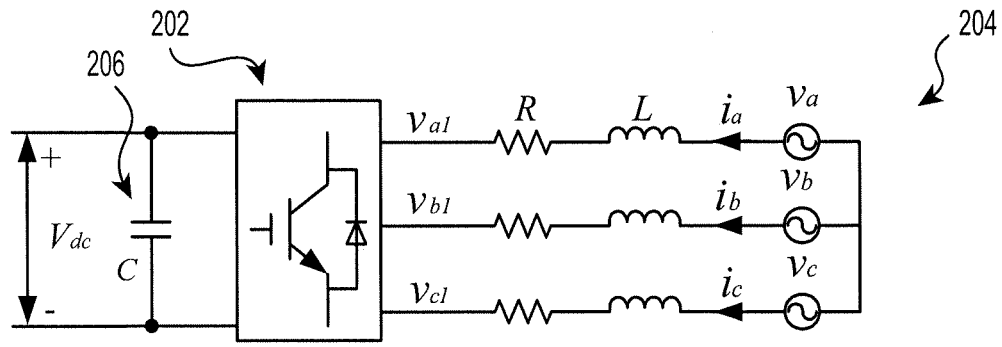
FIG. 2 is a circuit schematic including an example grid-connected PWM converter.

Referring now to FIG. 2, a circuit schematic including an example grid-connected PWM converter 202 is shown. In FIG. 2, a three-phase voltage source 204, which represents the voltage at the Point of Common Coupling ("PCC") of an AC system, is also shown. It should be understood that the AC system can be an electrical grid (or grid), for example. Additionally, an energy source or energy system can be connected to the electrical grid through a DC-link capacitor 206. Optionally, as shown in FIG. 2, the grid-connected PWM converter 202 can be operably connected between the DC-link capacitor 206 and the electrical grid 204. The grid-connected energy source or energy system discussed herein can optionally be a renewable energy source ("RES"). Alternatively or additionally, the grid-connected energy source or energy system can be a solar cell or array, a battery, a fuel cell, a wind turbine generator, a capacitor or another electrical grid. The energy sources and energy systems discussed herein are provided only as examples and this disclosure contemplates that one of ordinary skill in the art could use the techniques described herein to control other grid-connected energy sources and/or energy systems.

Referring to FIG. 2, in the d-q reference frame, the voltage balance across the grid filter can be described by Eqn. (1):

$$\begin{bmatrix} v_d \\ v_q \end{bmatrix} = R\begin{bmatrix} i_d \\ i_q \end{bmatrix} + L\frac{d}{dt}\begin{bmatrix} i_d \\ i_q \end{bmatrix} + \omega_s L\begin{bmatrix} -i_q \\ i_d \end{bmatrix} + \begin{bmatrix} v_{d1} \\ v_{q1} \end{bmatrix}, \quad (1)$$

where $\omega_s$ is the angular frequency of the grid voltage and L and R are the inductance and resistance of the grid filter, respectively. In the PCC voltage-oriented frame, the instant active and reactive powers absorbed by the GCC from the grid are proportional to the grid's d- and q-axis currents, respectively, as described by Eqns. (2) and (3):

$$p(t) = v_d i_d + v_q i_q = v_d i_d \quad (2)$$

$$q(t) = v_q i_d - v_d i_q = -v_d i_q \quad (3)$$

Figure 3:
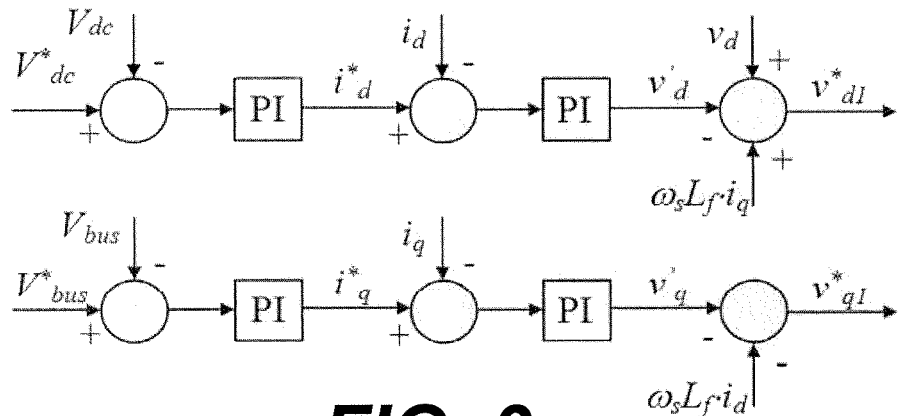
FIG. 3 is a block diagram illustrating a standard vector control structure.

Referring now to FIG. 3, a block diagram illustrating a standard vector control structure is shown. The standard vector control technique for the GCC is commonly used in renewable and electric power system applications. The standard vector control structure deploys a nested-loop structure consisting of a faster inner current loop and a slower outer loop, which is shown in FIG. 3. For example, the d-axis loop is used for DC-link voltage control, and the q-axis loop is used for reactive power or grid voltage support control. The control strategy of the inner current loop is developed by rewriting Eqn. (1) as Eqns. (4) and (5):

$$v_{d1} = -(Ri_d + L \cdot di_d/dt) + \omega_s L i_q + v_d \quad (4)$$

$$v_{q1} = -(Ri_q + L \cdot di_q/dt) - \omega_s L i_d \quad (5)$$

The bracketed terms of Eqns. (4) and (5) can be treated as the transfer function between the input voltage and output current for the d- and q-axis loops, respectively. The remaining terms can be treated as compensation terms. When using the standard vector control technique, the control signals (e.g., $v^*_{d1}$ and $v^*_{q1}$) generated by the d- and q-axis proportional-integral ("PI") controllers do not contribute in a right way in terms of the decoupled dq control objectives. Although there are compensation terms (e.g., $\omega_s L i_q$ and $\omega_s L i_d$), these terms do not contribute in a feedback control principle. Hence, the standard vector control structure has a competing control nature, which can result in malfunctions of the system.

Figure 4:
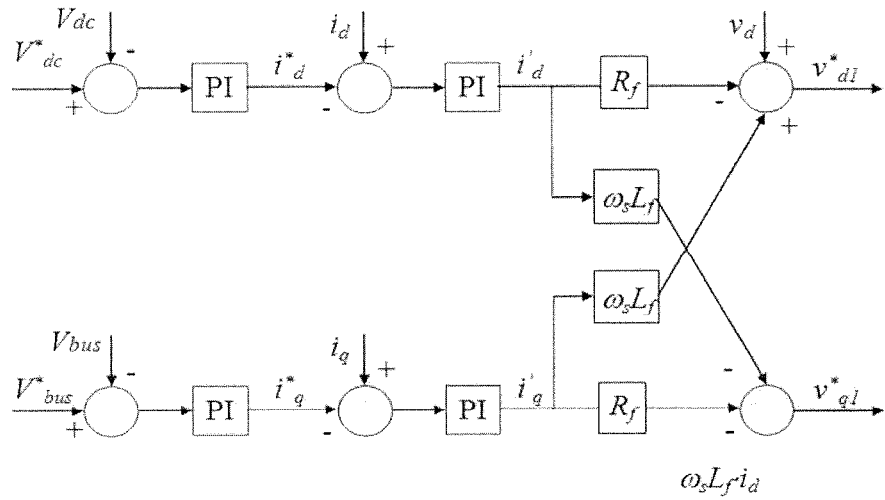
FIG. 4 is a block diagram illustrating a direct current vector control structure.

Referring now to FIG. 4, a block diagram illustrating a direct current vector control ("DCC") structure is shown. The DCC structure and technique is discussed in detail in U.S. Patent Application Publication No. 2012/0112551 to Li et al., entitled "INTELLIGENT POWER CONVERTER CONTROL FOR GRID INTEGRATION OF RENEWABLE ENERGIES." The DCC technique is an adaptive vector control technique that was developed to overcome the deficiencies of the standard vector control technique. Similar to the standard vector control technique, the theoretical foundation of the DCC technique is expressed in Eqns. (2) and (3), e.g., the use of d- and q-axis currents directly for active and reactive power control of the GCC system. Unlike the standard vector control technique that generates a d- or q-axis voltage from the GCC current-loop controller, the DCC technique generates a current signal by the d- or q-axis current-loop controller. In other words, the output of the controller is a d- or q-axis tuning current $i'_d$ or $i'_q$, while the input error signal tells the controller how much the tuning current should be adjusted during the dynamic control process. The development of the tuning current control strategy has adopted intelligent control concept, e.g., a control goal to minimize the absolute or root-mean-square ("RMS") error between the desired and actual d- and q-axis currents through an adaptive tuning strategy.

Figure 5:
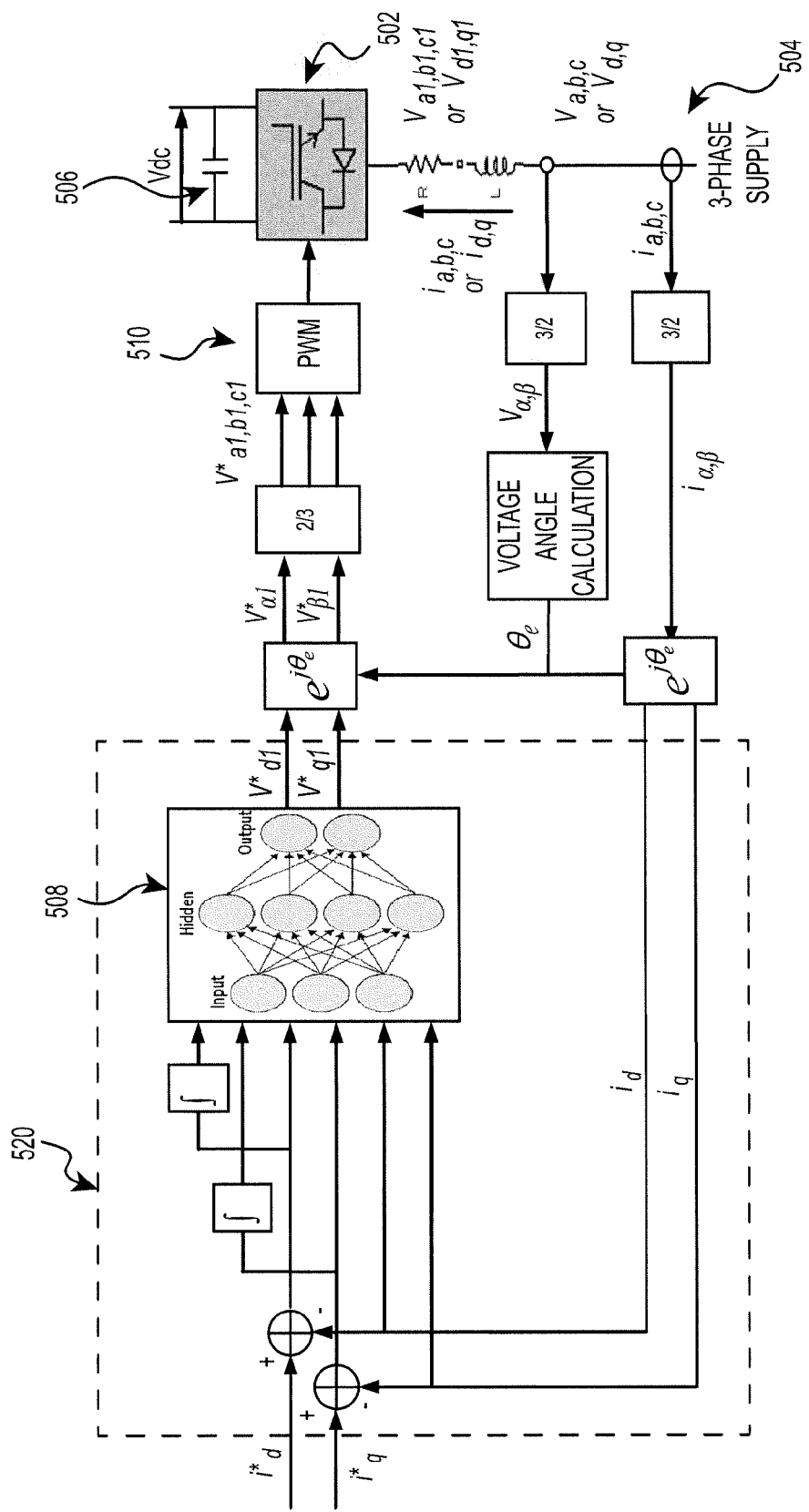
FIG. 5 is a block diagram illustrating an example vector control structure using an action neural network.

Referring now to FIG. 5, a block diagram illustrating an example vector control structure using an action neural network (e.g., a neural vector controller) is shown. Similar to FIG. 2, the block diagram includes a GCC 502, a three-phase voltage source 504 and a DC-link capacitor 506. As shown in FIG. 5, the GCC 502 can be operably connected between an electrical grid (e.g., the three-phase voltage source 504) and an energy source. Alternatively or additionally, the GCC 502 can be operably connected between the DC-link capacitor 506 and the electrical grid. As discussed above, the grid-connected energy source or energy system can optionally be an RES, a solar cell or array, a battery, a fuel cell, a wind turbine generator, a capacitor or another electrical grid. It should be understood that the GCC 502 output voltage (e.g., $V_{dc}$), the voltage at the PCC (e.g., $V_{a,b,c}$) and the current flowing from the PCC (e.g., $i_{a,b,c}$) of FIG. 5 are consistent with those shown in FIG. 2. Although the examples are provided below where the GCC is operably connected to a three-phase voltage source, this disclosure contemplates that the vector control using an action neural network can be applied when the GCC is operably connected to a single-phase voltage source.

As shown in FIG. 5, a control system 520 can be operably connected to the GCC 502. The control system 520 can include a nested-loop controller and an action neural network 508, where a d-axis loop of the nested-loop controller controls real power and a q-axis loop of the nested-loop controller controls reactive power. For example, the action neural network 508 can optionally be applied to the GCC 502 through a PWM module 510 to regulate the voltage output of the GCC 502 (e.g., $V_{a1,b1,c1}$). Optionally, the ratio of the GCC output voltage to the output of the action neural network can be a gain of $k_{PWM}$, which can equal to $V_{dc}/2$ if the amplitude of the triangle voltage waveform in the PWM scheme is 1V, for example.

In FIG. 5, the GCC output voltage in three-phase AC is shown by $V_{a1,b1,c1}$ and the corresponding voltages in the dq-reference frame are shown by $v_{d1}$ and $v_{q1}$. Additionally, the three-phase voltage at the PCC is shown by $V_{a,b,c}$ and the corresponding voltages in the dq-reference frame are shown by $v_d$ and $v_q$. Additionally, the three-phase current flowing from the PCC to the GCC is shown by $i_{a,b,c}$ and the corresponding currents in the dq-reference frame are shown by $i_d$ and $i_q$. Additionally, the voltages output from the action neural network are shown by $v^*_{d1}$ and $v^*_{q1}$ and the corresponding control voltages in the three-phase domain are shown by $V^*_{a1,b1,c1}$.

The action neural network 508 can be configured to receive a plurality of inputs, which are shown in FIG. 5. For example, the inputs can include a d-axis current ($i_d$), a q-axis current ($i_q$), a d-axis error signal (e.g., the difference between $i_d$ and a reference d-axis current ($i_d^*$)), a q-axis error signal (e.g., the difference between $i_q$ and a reference q-axis current ($i_q^*$)), an integral of the d-axis error signal and an integral of the q-axis error signal. The action neural network 508 can output a compensating dq-control voltage (e.g., $v^*_{d1}$ and $v^*_{q1}$). The action neural network 508 can be configured to optimize the compensating dq-control voltage based on the plurality of inputs. Additionally, the control system 520 can be configured to control the GCC 502 using the compensating dq-control voltage. Optionally, using the compensating dq-control voltage, the control system 520 can be configured to control the GCC 502 under distorted conditions.

As discussed above, the integrated GCC and grid system can be described by Eqn. (1), which can be rearranged into the standard state-space representation as shown by Eqn. (6), where the system states are $i_d$ and $i_q$, grid PCC voltages $v_d$ and $v_q$ are normally constant, and the GCC output voltages $v_{d1}$ and $v_{q1}$ are the control voltages that are to be specified by the output of the action neural network 508. For digital control implementation and the offline training of the action neural network 508, the discrete equivalent of the continuous system state-space model from Eqn. (6) can be obtained as shown by Eqn. (7), where $T_s$ represents the sampling period, k is an integer time step, F is the system matrix, and G is the matrix associated with the control voltage. A zero-order-hold discrete equivalent can be used to convert the continuous state-space model of the system in Eqn. (6) to the discrete state-space model in Eqn. (7). It should be understood that $T_s$=1 ms is used only as an example in the examples provided herein and that $T_s$ can have other values.

$$\frac{d}{dt}\begin{bmatrix} i_d \\ i_q \end{bmatrix} = -\begin{bmatrix} R_f/L_f & -\omega_s \\ \omega_s & R_f/L_f \end{bmatrix}\begin{bmatrix} i_d \\ i_q \end{bmatrix} - \frac{1}{L_f}\begin{bmatrix} v_{d1} \\ v_{q1} \end{bmatrix} + \frac{1}{L_f}\begin{bmatrix} v_d \\ v_q \end{bmatrix} \quad (6)$$

$$\begin{bmatrix} i_d(kT_s+T_s) \\ i_q(kT_s+T_s) \end{bmatrix} = F\begin{bmatrix} i_d(kT_s) \\ i_q(kT_s) \end{bmatrix} + G\begin{bmatrix} v_{d1}(kT_s)-v_d \\ v_{q1}(kT_s)-v_q \end{bmatrix} \quad (7)$$

Optionally, the action neural network 508, which can be denoted by the function A(●), can be a fully connected multi-layer perceptron including a plurality of input nodes, a plurality of hidden layers and a plurality of output nodes. The multilayer perceptron can optionally include two hidden layers, where each of the hidden layers includes six nodes. Shortcut connection can be provided between all pairs of layers. Alternatively or additionally, the multi-layer perceptron can optionally include six input nodes and two output nodes. This disclosure contemplates using a multi-layer perceptron having more or less input nodes, hidden layers/hidden layer nodes and/or output nodes. Alternatively or additionally, each of the nodes of the multilayer perceptron can optionally be configured to implement a hyperbolic tangent function.

As discussed above, the inputs to the action neural network 508 can include integrals of the d-axis error signal and the q-axis error signal, respectively. When the inputs to a neural network include only four inputs (e.g., the state currents and the error signal, i.e., the differences between the state currents and reference currents), the system controlled by the neural network may exhibit steady-state errors and may be unable to effectively track the reference dq current for a change of system parameters. This is due to the fact that the feed-forward network can stabilize at a non-target value any time the neural network inputs and outputs are unchanging from time-step to time-step. Accordingly, despite using error signals as inputs, a neural network can still create a steady state that is does not converge with a target value, for example, if the error signals are unchanging.

Thus, as shown in FIG. 5, the integral terms (e.g., integrals of each of the error signals) are provided as inputs to the action neural network 508. The integral terms provide a history of all past errors by summing errors together. For example, if there is an error in a given time step, the error is added to the integral term for the next time step. Thus, the integral term will only stay the same as it was at a previous time step if there is no error in a current time step, which prevents the action neural network from stabilizing at a non-target value unless ($\vec{i}_{dq}=\vec{i}^*_{dq}$). The other terms drive an unstable signal closer to the reference, and as the error becomes smaller, the difference in an integral term from its value for the previous time step diminishes, reducing its destabilizing influence and allowing the system to home in on the target.

The action neural network (e.g., the action neural network 508 shown in FIG. 5) can be configured to implement a dynamic programming ("DP") algorithm. Dynamic programming employs the principle of optimality and is a very useful tool for solving optimization and optimal control problems. An example structure of discrete-time DP includes a discrete-time system model and a performance index or cost associated with the system.

To simplify the expressions of derivatives, the discrete state-space model of Eqn. (7) for the neural-network-based GCC vector control structure discussed above with regard to FIG. 5 can be expressed by:

$$\vec{i}_{dq}(k+1)=F\cdot\vec{i}_{dq}(k)+G\cdot(\vec{v}_{dq1}(k)-\vec{v}_{dq}) \quad (8)$$

For a reference dq current, the control action applied to the system can be expressed by:

$$\vec{v}_{dq1}(k)=k_{PWM}\cdot A(\vec{i}_{dq}(k),\vec{i}_{dq}(k)-\vec{i}^*_{dq}(k),\vec{s}(k),\vec{w}) \quad (9)$$

where $\vec{w}$ represents the weight vector of the action neural network, and $\vec{s}(k)$ represents network integral input vector.

The DP cost function associated with the vector-controlled system can be expressed by:

$$J(\vec{x}(j),\vec{w}) = \sum_{k=j}^{K} \gamma^{k-j}\cdot U(\vec{i}_{dq}(k),\vec{i}^*_{dq}(k)) \quad (10)$$

where $\gamma$ is the discount factor with $0\leq\gamma\leq 1$, and K is the trajectory length used for training. Additionally, U(●) can be defined as:

$$U(\vec{i}_{dq}(k),\vec{i}^*_{dq}(k))=\sqrt{(i_d(k)-i^*_d(k))^2+(i_q(k)-i^*_q(k))^2}.$$

The function $J(\bullet)$, dependent on the initial time j and the initial state $\vec{i}_{dq}(j)$, is referred to as the cost-to-go of state $\vec{i}_{dq}(j)$ in the DP problem. The objective of the DP problem is to choose a vector control sequence, $\vec{v}_{dq1}(k), k=j, j+1, \ldots$, so that the function $J(\bullet)$ in Eqn. (10) is minimized.

The action neural network (e.g., the action neural network shown in FIG. 5) can be trained to minimize a cost of the DP algorithm (e.g., the DP cost function of Eqn. (10)) using a backpropagation through time ("BPTT") algorithm. The BPTT algorithm is gradient descent on $J(\vec{x}(j), \vec{w})$ with respect to the weight vector of the action neural network. The BPTT algorithm can be applied to an arbitrary trajectory with an initial state $i_{dq}(j)$, and thus be used to optimize the vector control strategy. In general, the BPTT algorithm consists of two steps: a forward pass which unrolls a trajectory, followed by a backward pass along the whole trajectory which accumulates the gradient descent derivative.

Example pseudo code for a DP-based BPTT algorithm for GCC Vector control is provided below.

DP-based BPTT algorithm for GCC Vector control

1: $J \leftarrow 0$
2: $\vec{s}(0) \leftarrow \vec{0}$ {Integral input}
3: {Unroll a full trajectory}
4: for k = 0 to K−1 do
5: $\vec{v}_{dq1}(k) \leftarrow k_{PWM} \cdot A(\vec{i}_{dq}(k), \vec{i}_{dq}(k) - \vec{i}_{dq}^*(k), \vec{s}(k), \vec{w})$ {Control action}
6: $\vec{i}_{dq}(k+1) \leftarrow F \cdot \vec{i}_{dq}(k) + G \cdot (\vec{v}_{dq1}(k) - \vec{v}_{dq})$ {Calculate next state}
7: $\vec{s}(k+1) \leftarrow \vec{s}(k) + (\vec{i}_{dq}(k) - \vec{i}_{dq}^*(k)) \cdot T_s$
8: $J \leftarrow J + \gamma^k \cdot U(\vec{i}_{dq}(k), \vec{i}_{dq}^*(k))$
9: end for
10: {Backwards pass along trajectory}
11: $J\_\vec{w} \leftarrow 0$
12: $J\_\vec{i}_{dq}(K) \leftarrow 0$
13: $J\_\vec{s}(K) \leftarrow 0$
14: for k = K−1 to 0 step −1 do
15: $J\_\vec{v}_{dq1}(k) \leftarrow G^T \cdot J\_\vec{i}_{dq}(k+1)$
16:
$$J\_\vec{i}_{dq}(k) \leftarrow k_{PWM} \frac{d(A(\vec{i}_{dq}(k), \vec{i}_{dq}(k) - \vec{i}_{dq}^*(k), \vec{s}(k), \vec{w}))}{d\vec{i}_{dq}(k)} \cdot$$
$$J\_\vec{v}_{dq1}(k) + T_s J\_\vec{s}(k+1) + F^T J\_\vec{i}_{dq}(k+1) +$$
$$\gamma^k \cdot \frac{\partial(U(\vec{i}_{dq}(k), \vec{i}_{dq}^*(k)))}{\partial \vec{i}_{dq}(k)}$$

17:
$$J\_\vec{s}(k) \leftarrow J\_\vec{s}(k+1) + k_{PWM} \cdot$$
$$\frac{\partial(A(\vec{i}_{dq}(k), \vec{i}_{dq}(k) - \vec{i}_{dq}^*(k), \vec{s}(k), \vec{w}))}{\partial \vec{s}(k)} \cdot J\_\vec{v}_{dq1}(k)$$

18:
$$J\_\vec{w} \leftarrow J\_\vec{w} + k_{PWM} \cdot$$
$$\frac{\partial(A(\vec{i}_{dq}(k), \vec{i}_{dq}(k) - \vec{i}_{dq}^*(k), \vec{s}(k), \vec{w}))}{\partial \vec{w}(k)} J\_\vec{v}_{dq1}(k)$$

19: end for
20: {on exit, $J\_\vec{w}$ holds $\frac{\partial J}{\partial \vec{w}}$ for the whole trajectory}

In particular, lines 1-9 evaluate a trajectory of length K using Eqns. (8)-(11). The integral inputs are approximated by a rectangular sum, in line 7 of the algorithm. Additionally, the second half of the algorithm (e.g., lines 10-20) calculates the desired gradient, $\partial J/\partial \vec{w}$. The desired gradient can be used for optimization of the function $J(\vec{w}(j), \vec{w})$ by using multiple iterations and multiple calls to the algorithm. In the pseudo code above, the variables $J\_\vec{i}_{dq}(k), J\_\vec{s}(k)$ and $J\_\vec{w}$ are workspace column vectors of dimension 2, 2, and $\dim(\vec{w})$, respectively. These variables hold the "ordered partial derivatives" of J with respect to the given variable name, so that for example $J\_\vec{i}_{dq}(k) = \partial^+ J/\partial \vec{i}_{dq}(k)$. This ordered partial derivative represents the derivative of J with respect to $\vec{i}_{dq}(k)$, assuming all other variables which depend upon $\vec{i}_{dq}(k)$ in lines 5-8 of the algorithm are not fixed, and thus their derivatives will influence the value of $J\_\vec{i}_{dq}(k)$ via the chain rule. The derivation of the gradient computation part of the algorithm (e.g., lines 11-19) is exact, and was derived following generalized backpropagation or automatic-differentiation techniques. In the pseudo code, the vector and matrix notation is such that all vectors are columns and differentiation of a scalar by a vector gives a column. Differentiation of a vector function by a vector argument gives a matrix, such that for example $(dA/dw)_{ij} = dA_i/dw_j$.

In lines 16-18, the algorithm refers to derivatives of the action neural network function $A(\bullet)$ with respect to its arguments, $\vec{i}_{dq}(k), \vec{s}(k)$ and $\vec{w}$. These derivatives can be calculated by ordinary neural-network backpropagation, which can be implemented as a sub-module, and should not be confused with the BPTT algorithm itself. The BPTT pseudo code above also requires the derivatives of the function $U(\bullet)$, which can be found directly by differentiating Eqn. (11). The pseudo code above uses matrices F and G, which represent the exact model of the plant; there was no need for a separate system identification process or separate model network. For the termination condition of a trajectory, a fixed trajectory length corresponding to a real time of 1 second (i.e. K=1000) is used. Additionally, $\gamma=1$ is used for the discount factor for the discount factor.

Figure 6:
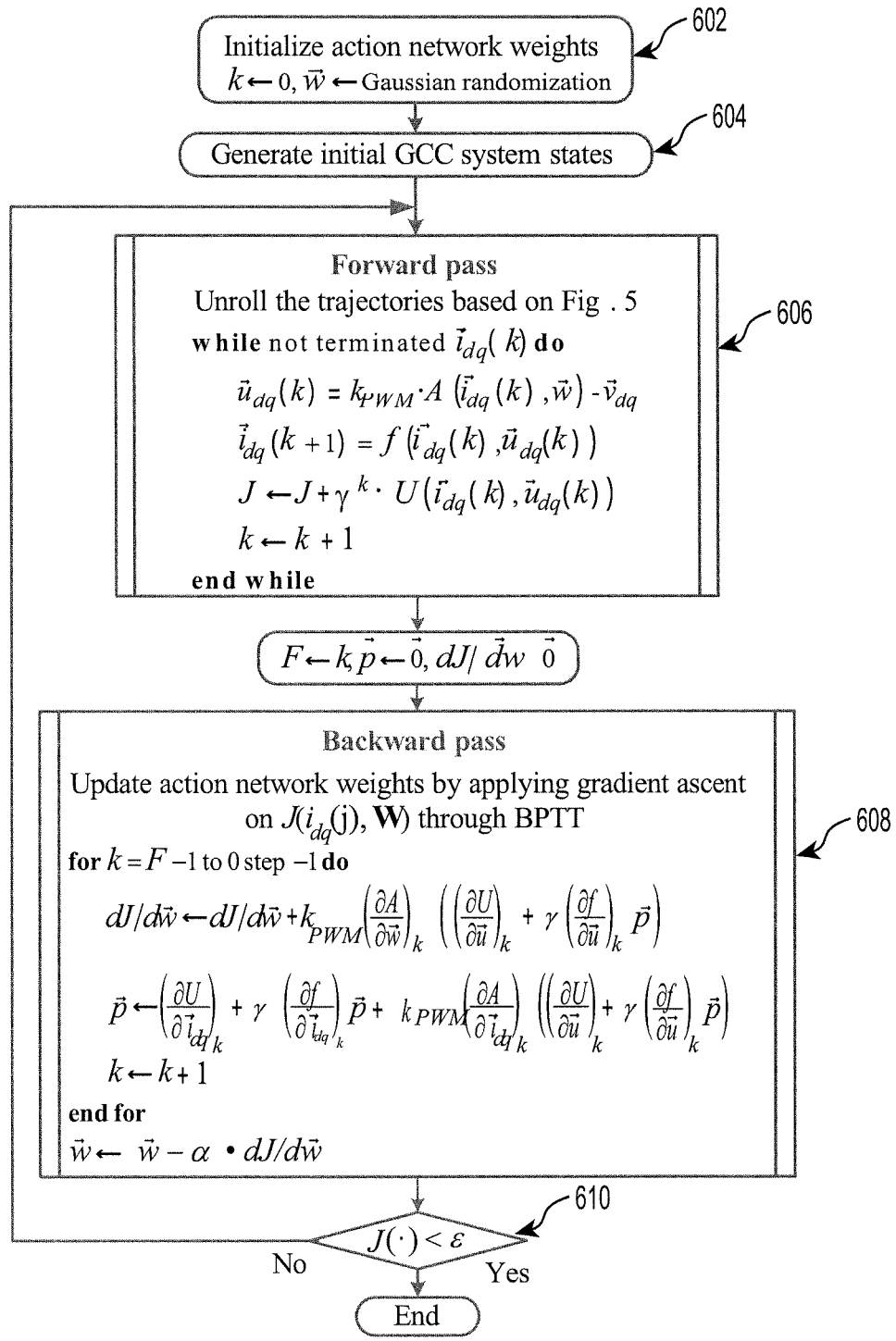
FIG. 6 is a flow diagram illustrating example operations for performing vector control using an action neural network.

Referring now to FIG. 6, a flow diagram illustrating example operations for performing vector control using an action neural network is shown. At 602, the action neural network weights are initialized. At 604, an initial state (e.g., an initial dq-current) can be randomly generated. Optionally, a reference dq-current can also be randomly generated. Then, at 606, a trajectory of the control system from the initial state can be unrolled in a forward pass. At 608, a backward pass along the trajectory is performed to accumulate the gradient descent derivative. Then, at 610, a determination is made as to whether the DP cost function is less than a threshold and/or whether the action neural network has been trained a sufficient number of times. If NO, the process returns to step 606. If YES, the process terminates. It should be understood that the threshold and/or number of trainings can vary based on the system ratings.

EXAMPLES

Optionally, to train the action neural network (e.g., the action neural network 508 shown in FIG. 5), system data of the integrated GCC and grid system can be specified for a typical GCC in renewable energy conversion system applications. This data includes 1) a three-phase 60 Hz, 690V voltage source signifying the electrical grid, 2) a reference voltage of 1200V for the DC-link, and 3) a resistance of 0.012Ω and an inductance of 2 mH standing for the grid filter.

The action neural network training was repeated for 10 different experiments, with each experiment having different initial weights. For each experiment, the training procedure included 1) randomly generating a sample initial state $i_{dq}(j)$, 2) unrolling the trajectory of the GCC system from the initial state, 3) randomly generating a sample reference dq current trajectory, 4) training the action neural network based on the DP cost function in Eqn. (10) and the BPTT training algorithm, and 5) repeating the process for all the sample initial states and reference dq currents. For each experiment, 10 sample initial states were generated uniformly from $i_d$=[100 A, 120 A] and $i_q$=[0 A, 20 A]. Each initial state was generated with its own random seed. Each trajectory duration was unrolled during training for a duration of 1 second, and the reference dq current was changed every 0.1 seconds. Ten reference current trajectories were generated randomly, with each trajectory having its own seed as well.

Figure 7A:
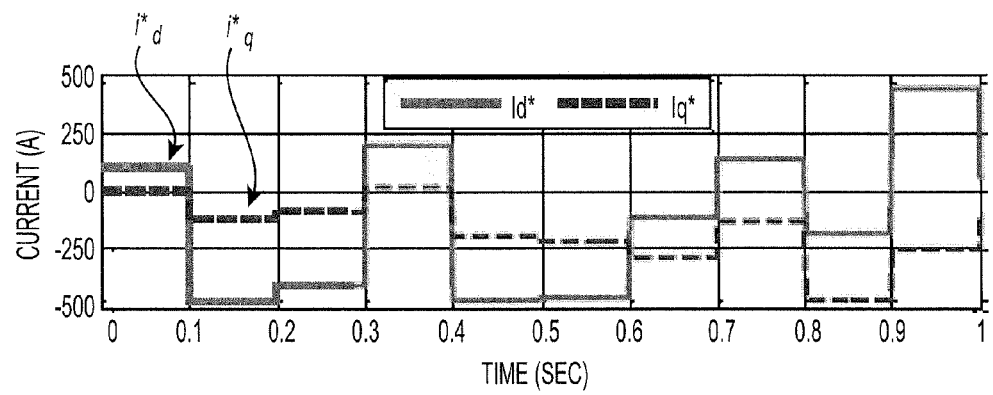
FIG. 7A is a graph illustrating a randomly generated reference dp current trajectory for training an action neural network.

Referring now to FIG. 7A, a graph illustrating a randomly generated reference dp current trajectory for training an action neural network is shown. The weights were initially all randomized using a Gaussian distribution with zero mean and 0.1 variance. Training used Resilient backpropagation ("RPROP") to accelerate learning, and RPROP was allowed to act on 10 trajectories simultaneously in batch update mode. For each experiment, training stops at 1000 iterations and the average trajectory cost per time step over the 10 trajectories was calculated. The trained network with the lowest average trajectory cost from the 10 experiments was picked as the final action neural network.

The generation of the reference current considered the physical constraints of a practical GCC system. For example, the GCC cannot operate beyond constraints due to rated power and PWM saturation. Both the randomly generated d- and q-axis reference currents (e.g., $i_d$* and $i_q$*) were first chosen uniformly from [−500 A; 500 A], where 500 A represents the assumed rated GCC current. Then, these randomly generated d- and q-axis current values were checked to see whether their resultant magnitude exceeds the GCC rated current limit and/or the GCC exceeds the PWM saturation limit. From the action neural network standpoint, the PWM saturation constraint stands for the maximum positive or negative voltage that the action neural network can output. Therefore, if a reference dq current requires a control voltage that is beyond the acceptable voltage range of the action neural network, it is impossible to reduce the cost (e.g., Eqn. (10)) during the training of the action neural network.

Example strategies were used to adjust randomly generated d- and q-axis reference currents. First, if the rated current constraint is exceeded, the reference dq current can be modified by keeping the d-axis reference current $i_d$* unchanged to maintain active power control effectiveness (e.g., Eqn. (2)) while modifying the q-axis reference current $i_q$* to satisfy the reactive power or AC bus voltage support control demand (e.g., Eqn. (3)) as much as possible as shown by:

$$i^*_{q\_new} = \text{sign}(i^*_q) \cdot \sqrt{(i^*_{dq\_max})^2 - (i^*_d)^2} \quad (12)$$

Second, if the PWM saturation limit is exceeded, the q-axis reference current can modified by:

$$v^*_{q1} = -i^*_d X_f, v^*_{d1} = \sqrt{(v^*_{dq1\_max})^2 - (v^*_{q1})^2}$$

$$i^*_q = (v^*_{d1} - v_d)/X_f \quad (13)$$

which represents a condition of keeping the q-axis reference voltage $v_{q1}$* unchanged so as to maintain the active power control effectiveness while modifying the d-axis reference voltage $v_{d1}$* to meet the reactive power control demand as much as possible.

Alternatively or additionally, the energy source can be controlled by maintaining active power control effectiveness while meeting reactive power control demand. For example, it is possible to minimize $|Q_{ac} - Q^*_{ac}|$ subject to, $P_{ac} = P^*_{ac}$, $\sqrt{i_d^2 + i_q^2} \leq I_{rated}$, and $$\sqrt{\frac{v_{d1}^2 + v_{q1}^2}{3}} \leq \frac{V_{dc}}{2\sqrt{2}}.$$

This can be accomplished as follows. First, if the amplitude of the reference dq current $|i_{dq}^*|$ exceeds the rated current limit, $i_q^*$ and $i_d^*$ can be modified by $i^*_{d\_new} = i^*_d$, $i^*_{q\_new} = \text{sign}(i^*_q) \cdot \sqrt{(I_{rated})^2 - (i^*_d)^2}$ before being applied to the action neural network. Second, if $|v_{dq1}|$ exceeds the PWM saturation limit, the action neural network can automatically turn into a state by regulating $v_{q1}$ to maintain active power control effectiveness while restraining $v_{d1}$ to meet the reactive power control demand as much as possible.

Figure 7B:
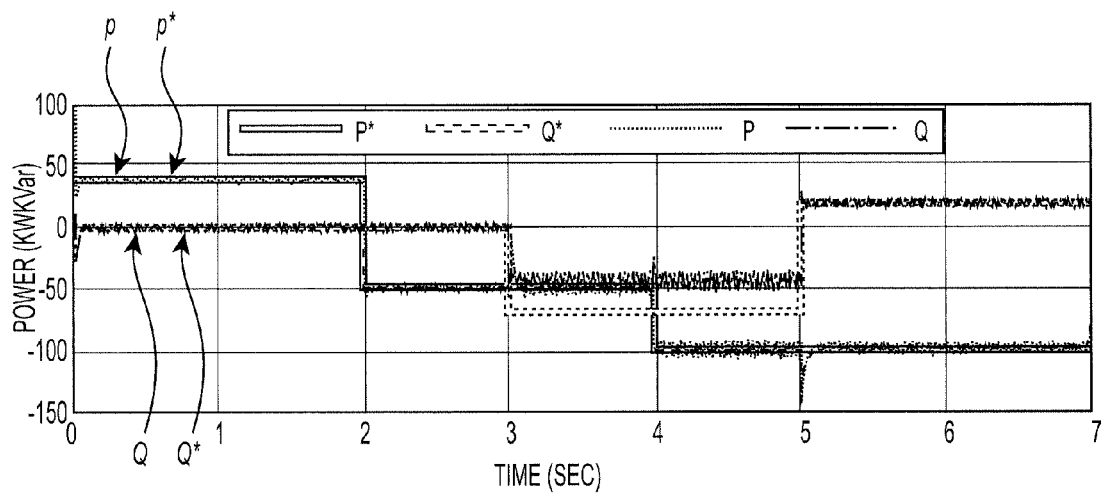
FIG. 7B is a graph illustrating performance of an example vector control structure using an action neural network for high generating reactive power demand.

Referring now to FIG. 7B, a graph illustrating performance of an example vector control structure using an action neural network for high generating reactive power demand is shown. The active power reference at t=0 is 40 kW and changes to −50 kW and −100 kW at t=2 seconds and t=4 seconds, respectively. The reactive power demand causes the required control voltage over the GCC PWM saturation limit at t=3 s. As shown by FIG. 7B, the vector controller automatically restrains the reactive power control but maintains the active power control effectiveness. At t=5 s, when the generating reactive power demand drops causing the control voltage below the PWM saturation limit, the vector controller returns to its normal control condition immediately.

Figure 7C:
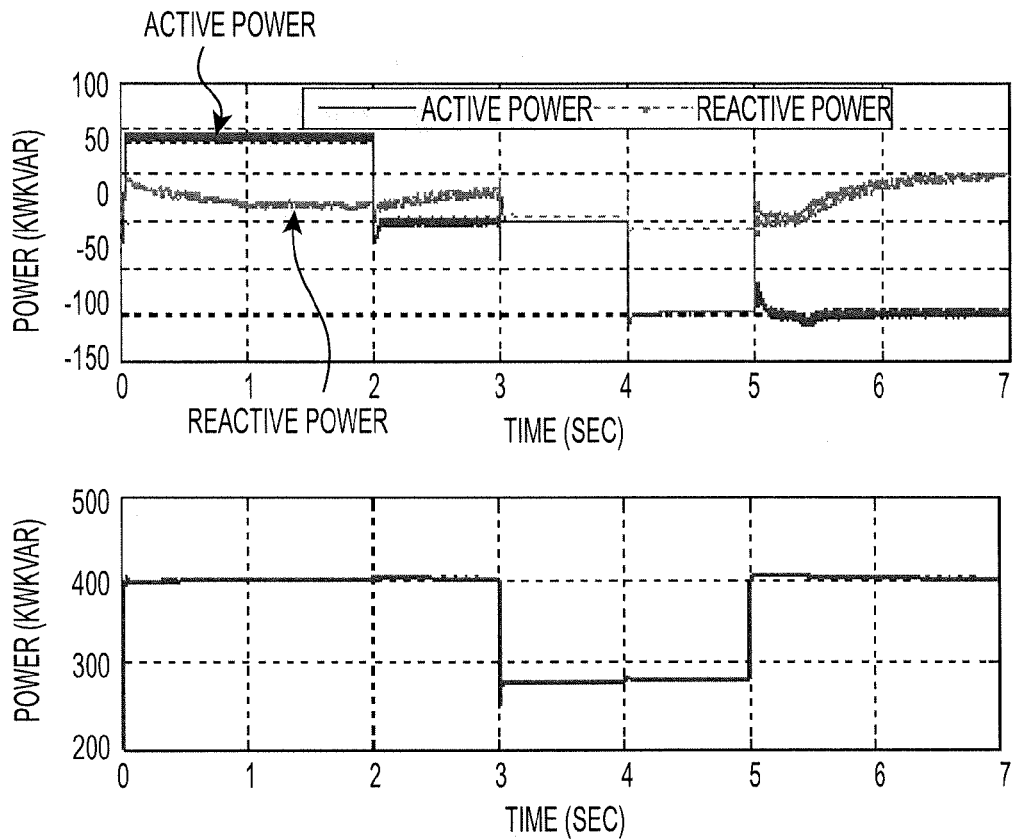
FIG. 7C is a graph illustrating performance of an example vector control structure using an action neural network for PCC voltage support control under a high voltage drop caused by a fault.

Referring now to FIG. 7C, a graph illustrating performance of an example vector control structure using an action neural network for PCC voltage support control under a high voltage drop caused by a fault (e.g., at t=3 s) is shown. As shown in FIG. 7C, due to the inverter PWM saturation constraint, the vector controller is unable to keep the PCC voltage at 1 pu to compensate the voltage drop. Instead, it operates by maintaining the active power control effectiveness while providing PCC voltage support control as much as possible. At t=5 s, when the short circuit is cleared, the vector controller returns to its normal operating condition and the PCC bus voltage recovers to the rated bus voltage almost immediately, demonstrating excellent performance of the vector controller under the physical constraints of the GCC.

Figure 8:
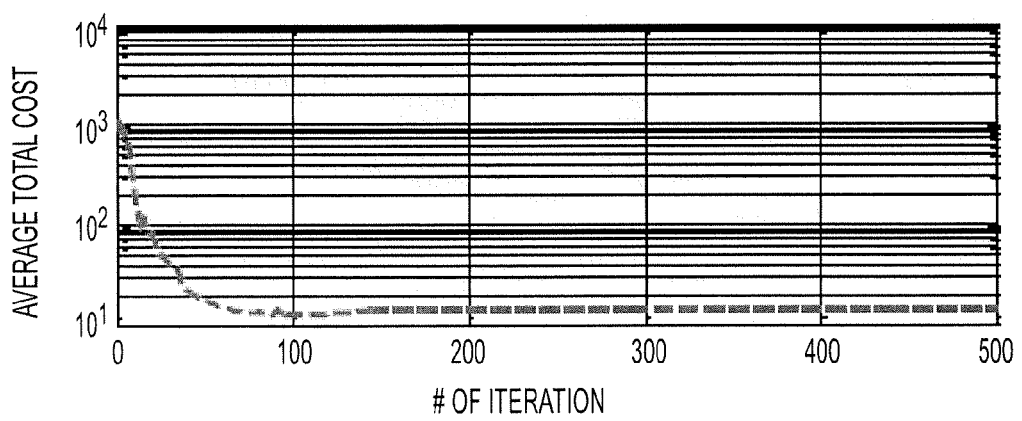
FIG. 8 is a graph illustrating an average DP cost per trajectory time step for an example successful training of an action neural network.

Referring now to FIG. 8, a graph illustrating an average DP cost per trajectory time step for an example successful training of an action neural network is shown. In FIG. 8, the overall average trajectory cost dropped to small number quickly, demonstrating good learning ability of the action neural network for the vector control application.

Figure 9:
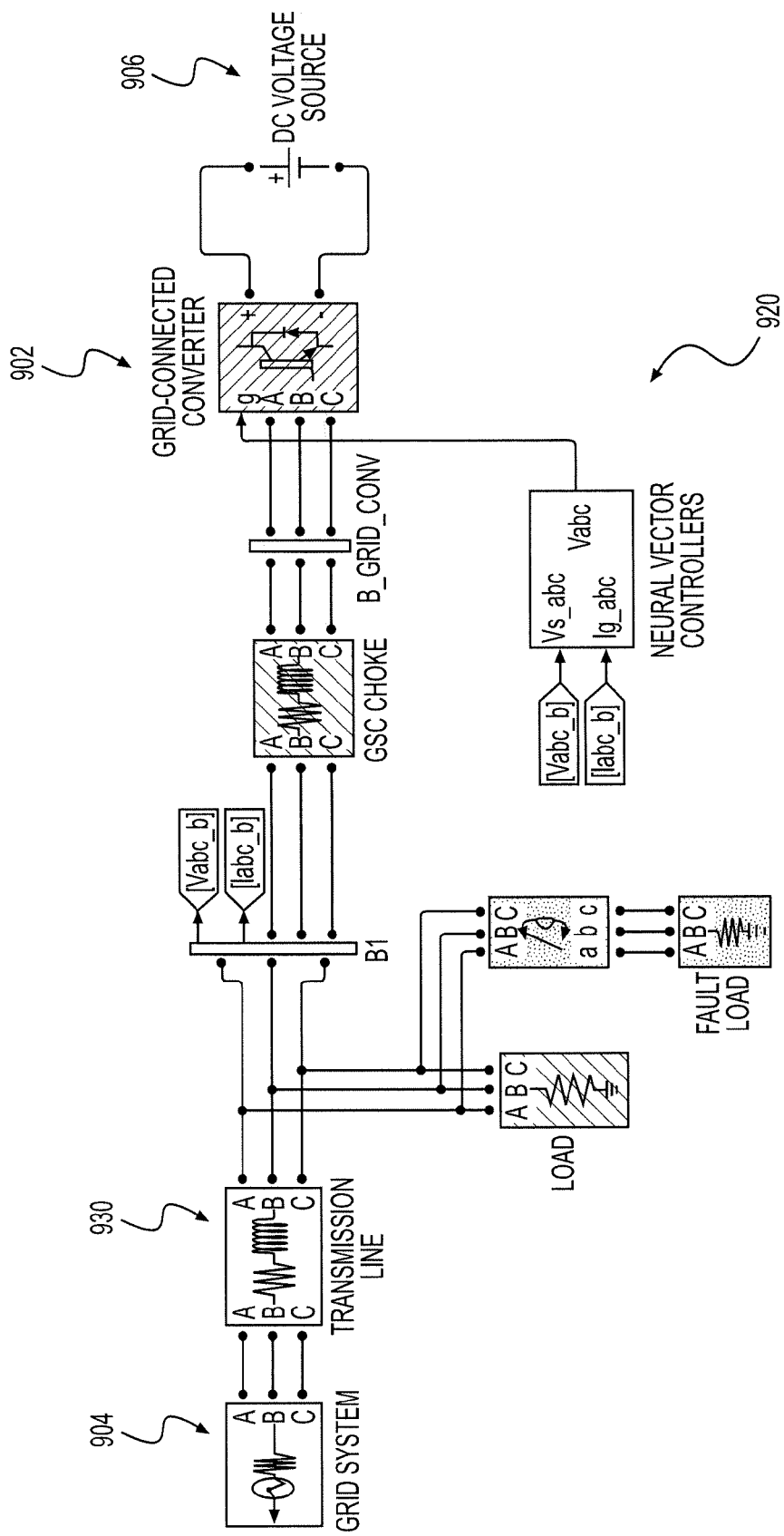
FIG. 9 is a block diagram illustrating a vector control structure in a power converter switching environment.

To evaluate the performance of the vector control approach using an action neural network and compare it with the conventional standard and DCC vector control approaches, an integrated transient simulation system of a GCC system was developed by using power converter switching models using SIMPOWERSYSTEMS made by MATHWORKS of NATICK, MA. A block diagram illustrating a vector control structure in a power converter switching environment used for the simulations is shown in FIG. 9. The block diagram includes a GCC 902, an electrical grid 904 and a DC-link capacitor 906, similar to FIGS. 2 and 5. Additionally, the block diagram includes a control system 920. The GCC 902 is a DC/AC PWM converter. The GCC 902 switching frequency is 1980

Hz and loss of the power converter is considered. In the converter switching environment, the evaluation can be made under close to real-life conditions, including 1) real-time computation of PCC voltage space vector position, 2) measurement of instant grid dq current and PCC dq voltage, and 3) generation of the dq control voltage by the controller in the PCC voltage-oriented frame. The PCC bus is connected to the grid through a transmission line 930 that is modeled by an impedance. A fault-load 940 is connected before the PCC bus for the purpose of evaluating how the controller behaves when a fault appears in the grid. For digital control implementation of the neural or conventional controllers, the measured instantaneous three-phase PCC voltage and grid current pass through a zero-order-hold ("ZOH") block. The ZOH is also applied to the output of the controller before being connected to the converter PWM signal generation block.

Figure 10:
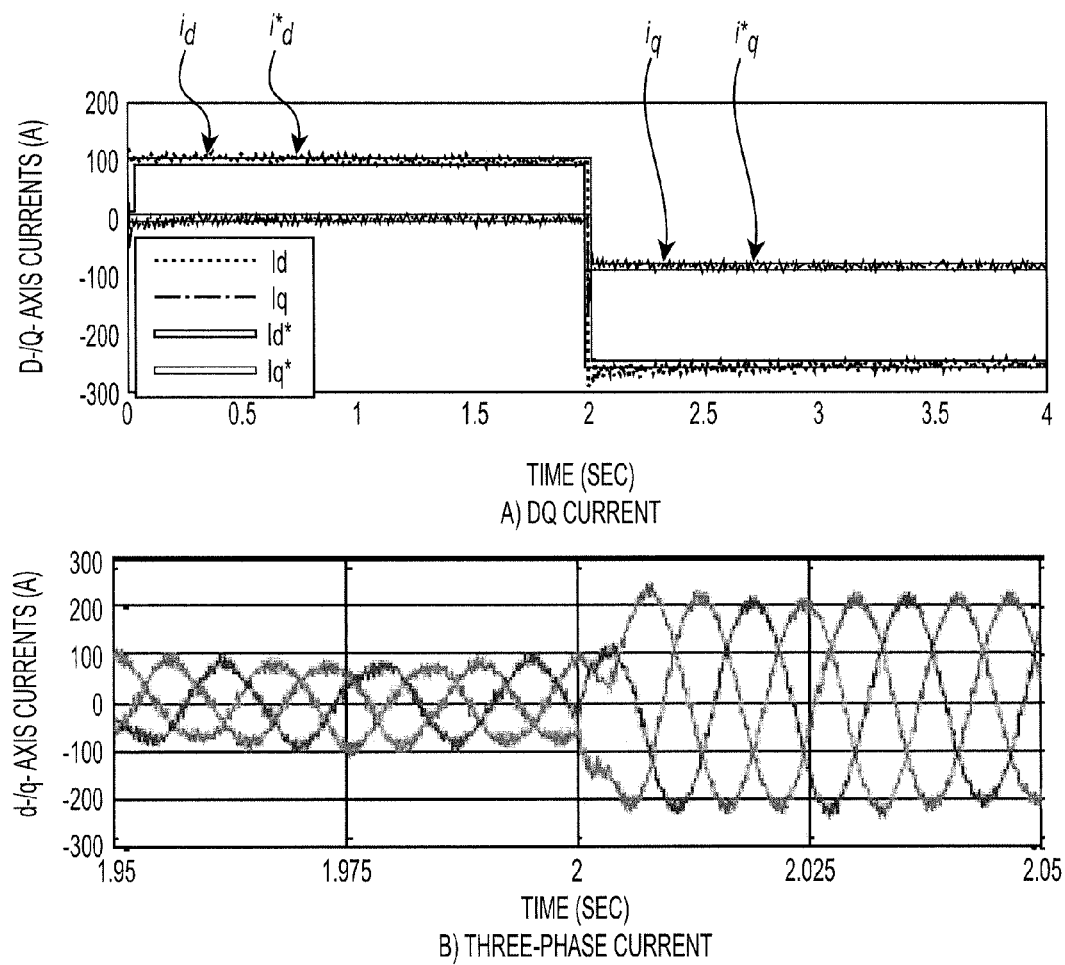
FIGS. 10A-10B are graphs illustrating performance of a vector controller using an action neural network.

The reference current is generated randomly within the acceptable GCC current range for the neural vector controller tracking validation. FIGS. 10A-10B are graphs illustrating performance of a vector controller using an action neural network, which presents a case study of tracking the dq reference current using a neural vector controller in the power converter switching environment. The sampling time is $T_s=1$ ms. In FIGS. 10A-10B, initial system states can be generated randomly and the dq reference currents can change to any values, within the converter rated current and PWM saturation limit, that are not used in the training of the action neural network. At the beginning, both the GCC d- and q-axis currents are zero, and the d- and q-axis reference currents are 100 A and 0 A, respectively. After the start of the system, the neural vector controller quickly regulates the d- and q-axis currents to the reference values. When the reference dq current changes to new values at t=2 s and t=4 s, the neural vector controller restores d- and q-axis current to the reference currents immediately, as shown in FIG. 10A. However, due to the switching impact, the actual dq current oscillates around the reference current. An examination of the three-phase grid current shows that the current is properly balanced, which is shown in FIG. 10B. For any command change of the reference current within the converter rated current and PWM saturation limit, the system can be adjusted to a new reference current immediately, demonstrating strong optimal control capability of the neural vector controller. Since the assumed rated GCC current is 500 A, for a d-axis reference current $i_d^*$ within [−500 A, 500 A], the q-axis current $i_q^*$ cannot exceed the lower value calculated from Eqns. (12) and (13).

Figure 11:
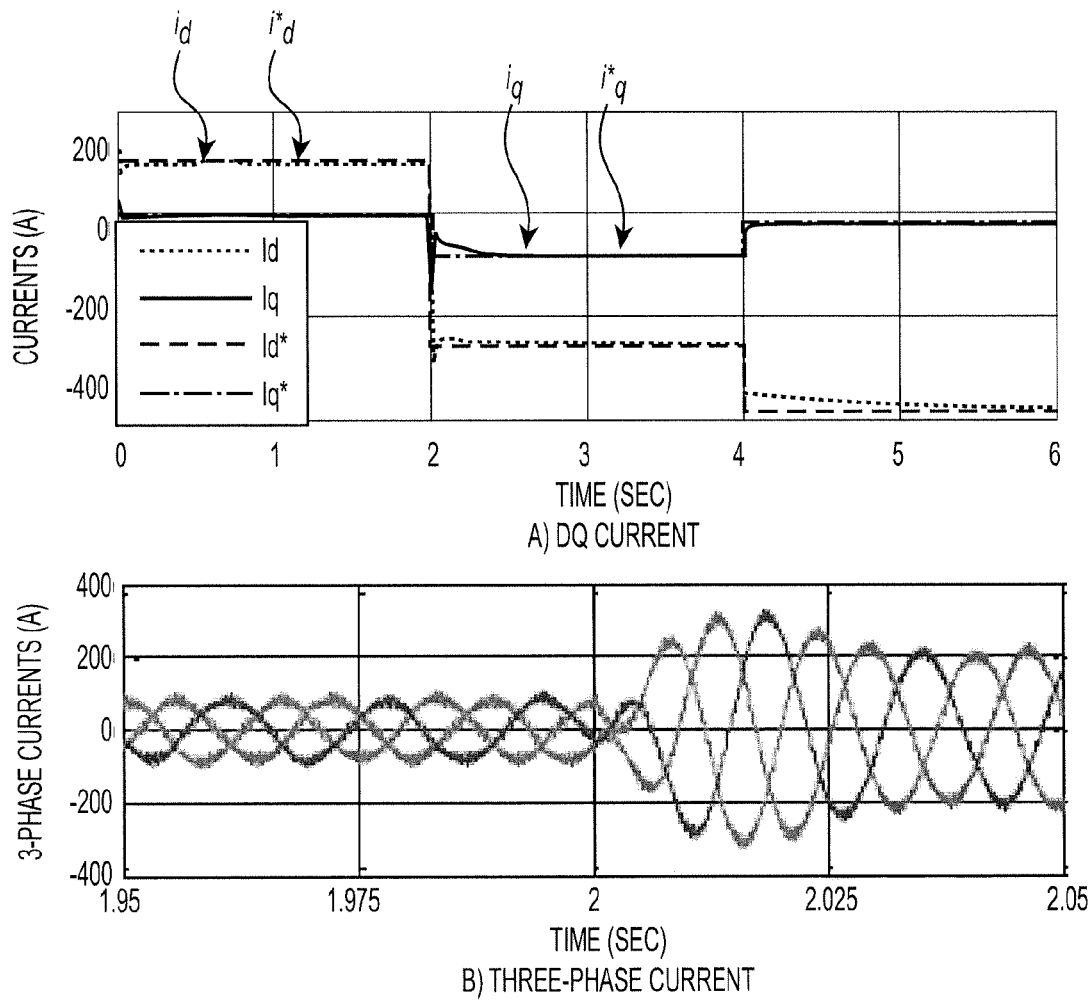
FIGS. 11A-11B are graphs illustrating performance of a conventional standard vector controller.
Figure 12:
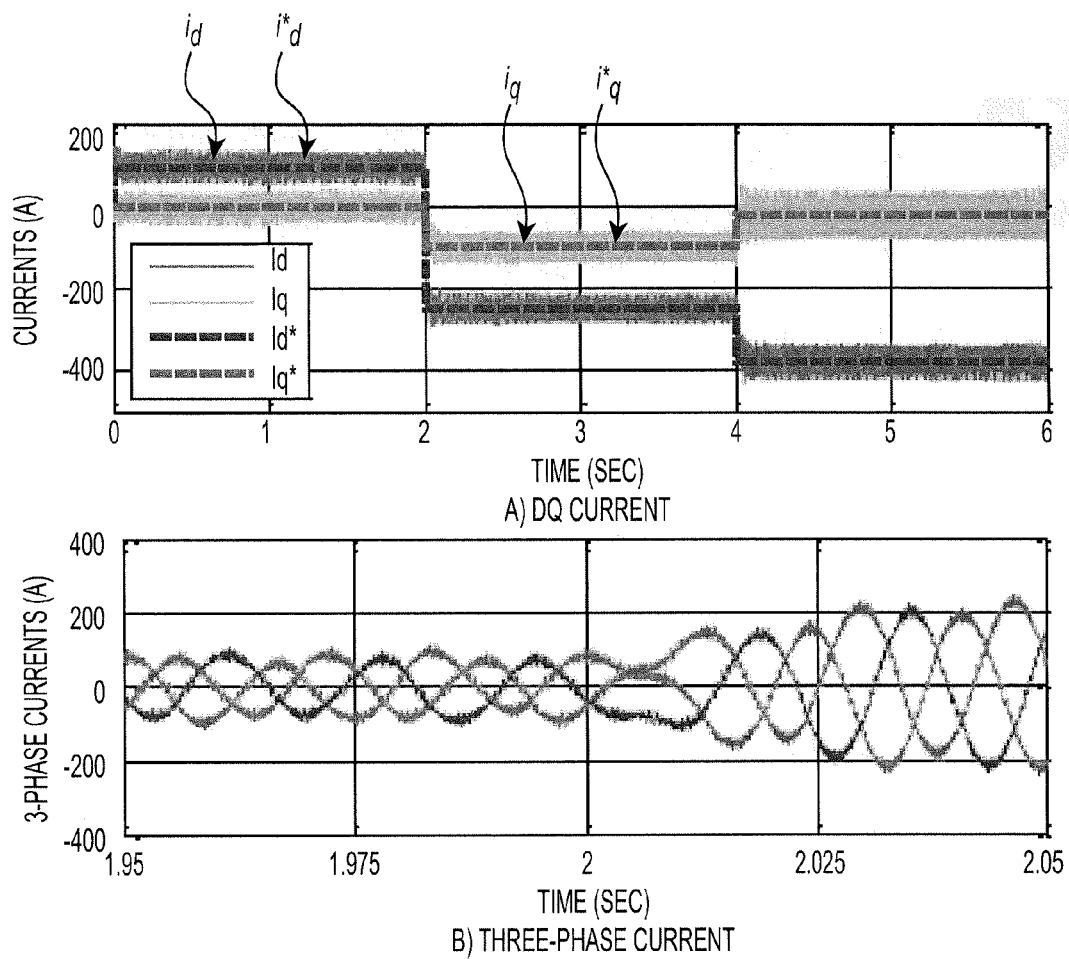
FIGS. 12A-12B are graphs illustrating performance of a direct current vector controller.

Referring now to FIGS. 11A-12B, the performance of the standard and DCC vector control approaches are discussed under the same conditions used in FIGS. 10A-10B but with a smaller sampling time of 0.1 ms. Even so, as compared to the vector control using an action neural network approach having the sampling time of 1 ms, the actual dq current of the standard and DCC vector control controller oscillates worse than that of the neural vector controller. Additionally, there is more distortion and unbalance in the three-phase grid current. FIGS. 11A-11B are graphs illustrating performance of a conventional standard vector controller, and FIGS. 12A-12B are graphs illustrating performance of a direct current vector controller.

The current-loop PI controller is designed by using the conventional standard and the direct-current vector control techniques, respectively. For the conventional standard vector control structure (e.g., FIG. 3), the gains of the digital PI controller are designed based on the discrete equivalent of the system transfer function, as shown in Eqns. (4) and (5). For the DCC vector control structure (e.g., FIG. 4), the gains of the digital PI controller are tuned until the controller performance is acceptable. With the sampling time of $T_s=1$ ms, no stable PI gains were obtained for the conventional standard vector control approach. Additionally, for the DCC vector control approach, it is easier to get a stable PI gain but the actual dq current oscillates around the reference current much higher than that of the neural vector controller.

The comparisons were also conducted for other reference dq current cases. All the case studies showed that the vector control using an action neural network approach always performs better than both conventional and DCC vector control approaches. In general, the neural vector controller can get to a reference current very quickly and stabilize around the reference with very small oscillations. This gives the neural network controlled GCC system the following advantages: i) low harmonic current distortion, ii) small ac system unbalance, iii) reduced sampling and computing power requirement, and iv) improvement of GCC connection to the grid without synchronization. One of ordinary skill in the art would recognize that the synchronization for GCC grid connection has been an issue investigated by many researchers in the field. The advantage of the neural network vector controller in this perspective can result in important impact in developing new microgrid control technologies and overcome many existing challenges for control and operation of a microgrid.

As discussed above, GCCs can be used to connect wind turbines and solar photovoltaic ("PV") arrays to the electrical grid. Due to variable weather conditions, the power transferred from a wind turbine or PV array changes frequently, making the GCC reference current vary constantly over the time. Over periods shorter than one hour, for example, wind speed can be approximated as the superposition of a slowly varying mean speed $V_w$ plus N sinusoidal components having frequencies $\omega_i$, amplitudes $A_i$ and random phases $\phi_i$ as shown by:

$$v_w(t) = V_w + \sum_{i=1}^{N} A_i \cos(\omega_i t + \phi_i) \tag{14}$$

Figure 13:
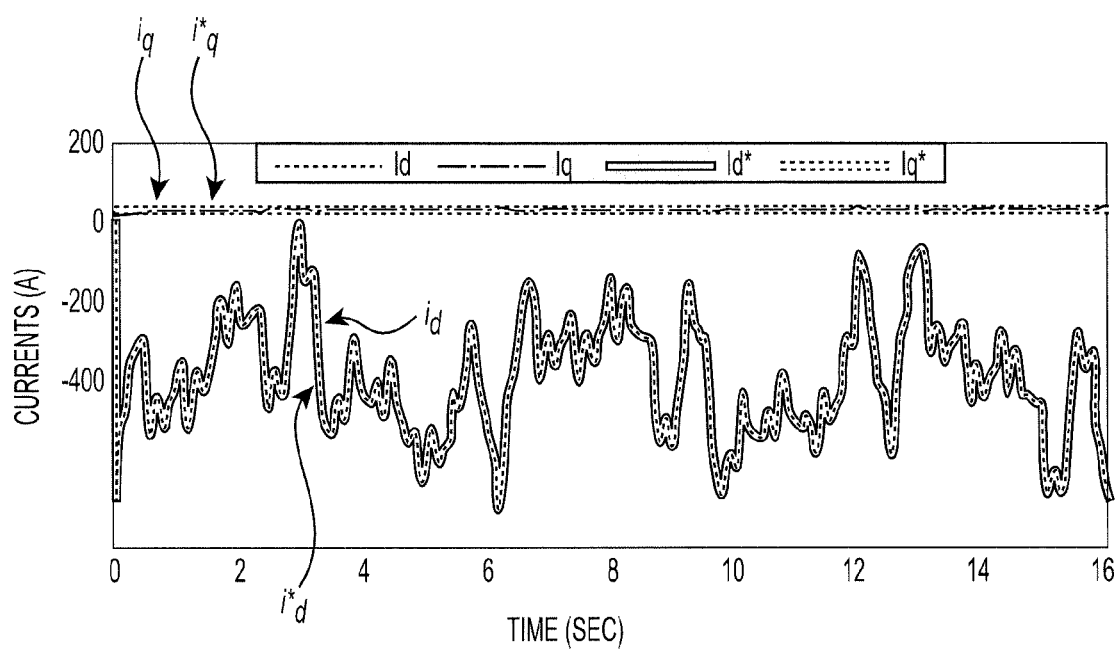
FIG. 13 is a graph illustrating performance of neural vector controllers under variable reference current conditions in a power converter switching environment.

Based on Eqn. (14), a variable d-axis reference current is generated while q-axis reference current is zero (e.g., zero reactive power), which corresponds to typical wind power production under a fluctuating and gusty wind condition. FIG. 13 is a graph illustrating performance of neural vector controllers under variable reference current conditions (e.g., the variable conditions described above) in a power converter switching environment. The variable d- and q-axis reference currents described above are shown in FIG. 13. Due to the motor sign convention used in FIG. 2, power generation from a wind turbine is represented by negative d-axis current values as shown in FIG. 13. Similar to above, FIG. 13 shows that the neural vector controller performs very well in tracking the variable reference current in the power converter switching environment.

GCC stability is another main issue being investigated in standard vector control approaches. In general, these investigations have focused on the GCC performance for either system parameter changes or for unbalanced or distorted AC system conditions. A small-signal model can be used for a sensitivity study of the GCC under variable system parameter conditions. As discussed below, the vector control using an action neural network approach is investigated for two variable GCC system conditions, e.g., 1) variation of grid-filter resistance and inductance and 2) variable PCC voltage.

Figure 14:
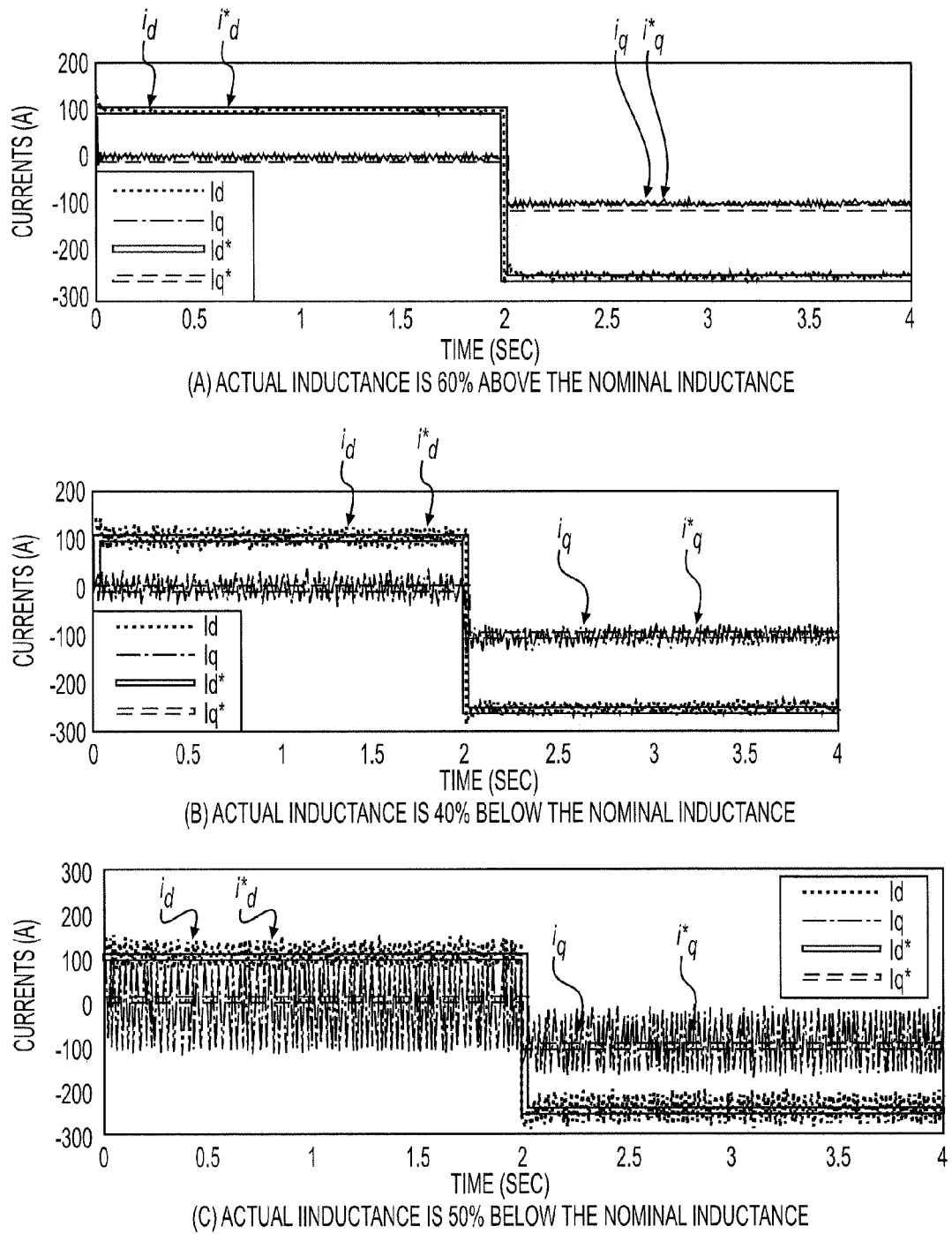
FIGS. 14A-14C are graphs illustrating performance of a vector controller using an artificial neural network.

Referring now to FIGS. 14A-14C, graphs illustrating performance of a vector controller using an artificial neural network are shown. The neural vector controller is mainly affected by variation of the grid-filter inductance but not the resistance. For example, FIGS. 14A-14C show how the neural vector controller is affected as the grid-filter inductance deviates from the nominal value used in training the neural network. In general, if the actual inductance is smaller than the nominal value, the performance of the neural vector controlled GCC deteriorates as shown in FIGS. 14B and 14C. In FIGS. 14B and 14C, the actual inductance is 40% and 50% below the nominal value, respectively. If the actual inductance is larger than the nominal value, the performance of the controller is almost not affected as shown in FIG. 14A. In FIG. 14A, the actual inductance is 60% above the nominal value. However, as the actual inductance is higher than the nominal inductance, it is easier for the GCC to get into the PWM saturation, particularly for generating reactive power conditions. Additionally, when the actual inductance is over 50% below the nominal value, the impact becomes significant and high distortion and unbalance are found in the grid current as shown in FIG. 14C. A comparison study also demonstrates that the neural vector controller is much more stable and that it performed better than both conventional standard and DCC vector control methods under the variable grid-filter inductance conditions.

Figure 15:
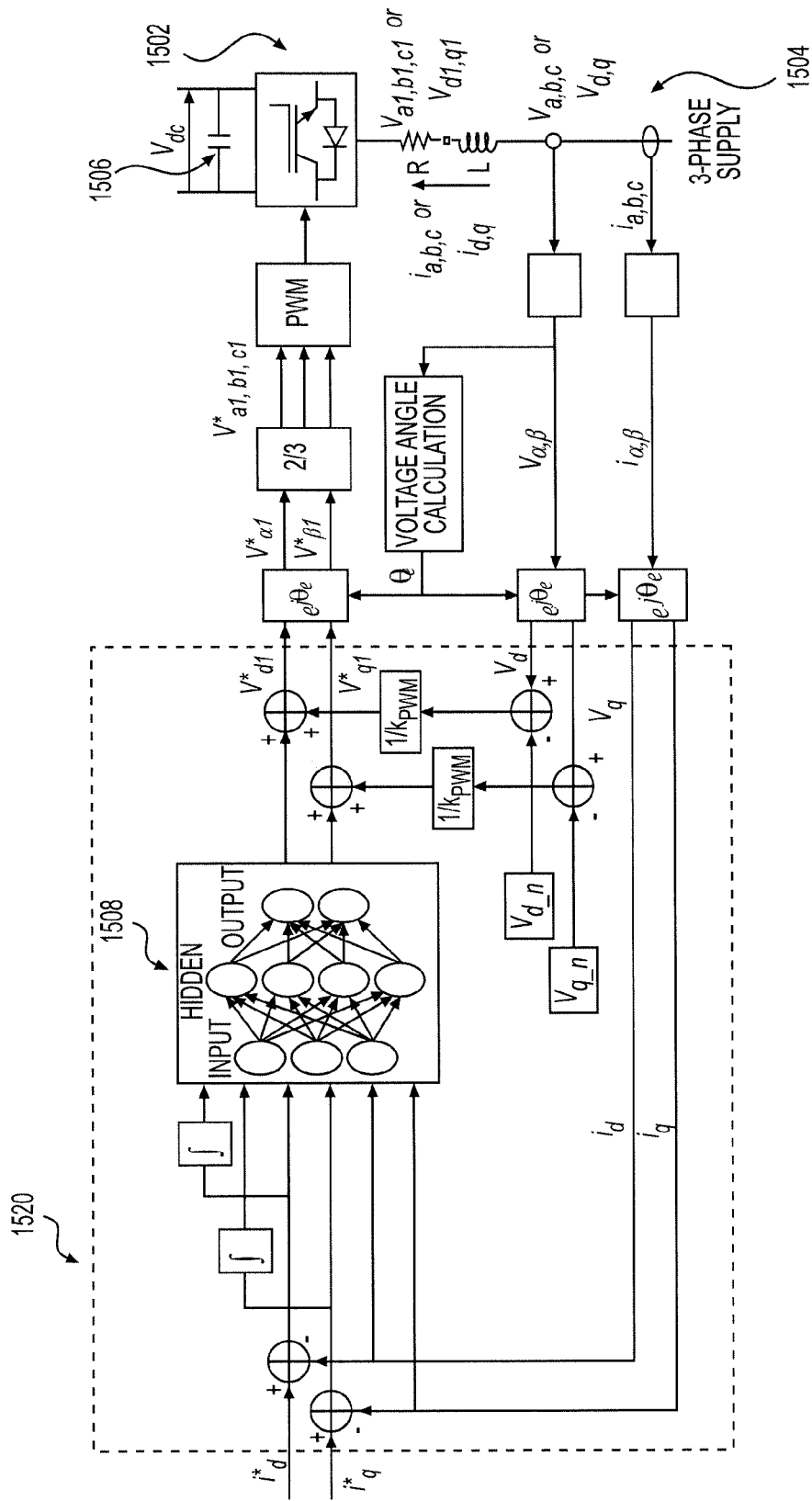
FIG. 15 is a block diagram illustrating an example vector control structure using an action neural network where the disturbance voltage is introduced to the output of the action neural network.

Regarding the variation of the GCC voltage, a technique can be employed to prevent the neural vector controller from being affected by the GCC voltage variation. Assume that the nominal and disturbance components of the PCC dq voltage are $\vec{v}_{dq\_n}$ and $\vec{v}_{dq\_dis}$, respectively. Then, Eqn. (6) can be rewritten as:

$$\frac{d}{dt}\vec{i}_{dq} = -F_c \cdot \vec{i}_{dq} - (\vec{v}_{dq1} - [\vec{v}_{dq\_n} + \vec{v}_{dq\_dis}])/L_f \quad (15)$$

where $F_c$ is the continuous system matrix. Since the training of the action neural network discussed above does not consider PCC voltage disturbance, the neural vector controller may be unable to track the reference demand or lose stability if a high voltage disturbance appears on the PCC bus. One way to overcome the disturbance impact is to introduce d- and q-axis disturbance voltage terms as inputs to the action neural network. It should be understood that this may make the training more difficult, and the improvement may not be evident. Alternatively, instead of introducing the d- and q-axis disturbance voltage terms as inputs to the action neural network, the disturbance voltage can be introduced to the output of a trained action neural network. In this way, it is possible to neutralize the disturbance. Accordingly, the control voltage applied to the system becomes:

$$\vec{v}_{dq1}(k) = k_{PWM}\cdot[A(\vec{i}_{dq}(k), \vec{w}) + \vec{v}_{dq\_dis}/k_{PWM}] \quad (16)$$

where $\vec{v}_{dq} = \vec{v}_{dq\_n} + \vec{v}_{dq\_dis}$ is the actual PCC voltage. Referring now to FIG. 15, a block diagram illustrating an example vector control structure using an action neural network where the disturbance voltage is introduced to the output of the action neural network is shown. Similar to FIG. 5, the block diagram includes a GCC 1502, a three-phase voltage source 1504, a DC-link capacitor 1506, a control system 1520 and an action neural network 1508. These features are described in detail above with regard to FIG. 5 and are therefore not described in further detail below. In FIG. 15, $V_{d\_n}$ and $V_{q\_n}$ are the d and q components, respectively, of the nominal GCC voltage (e.g., the disturbance voltage). It should be understood that, in the PCC voltage oriented frame, $V_{q\_n}=0V$. In FIG. 15, kPWM is the gain of the GCC and equals to Vdc/2. As discussed below, the performance evaluation demonstrates that this strategy is very effective to maintain the action neural network performance under distorted PCC voltage conditions.

Figure 16:
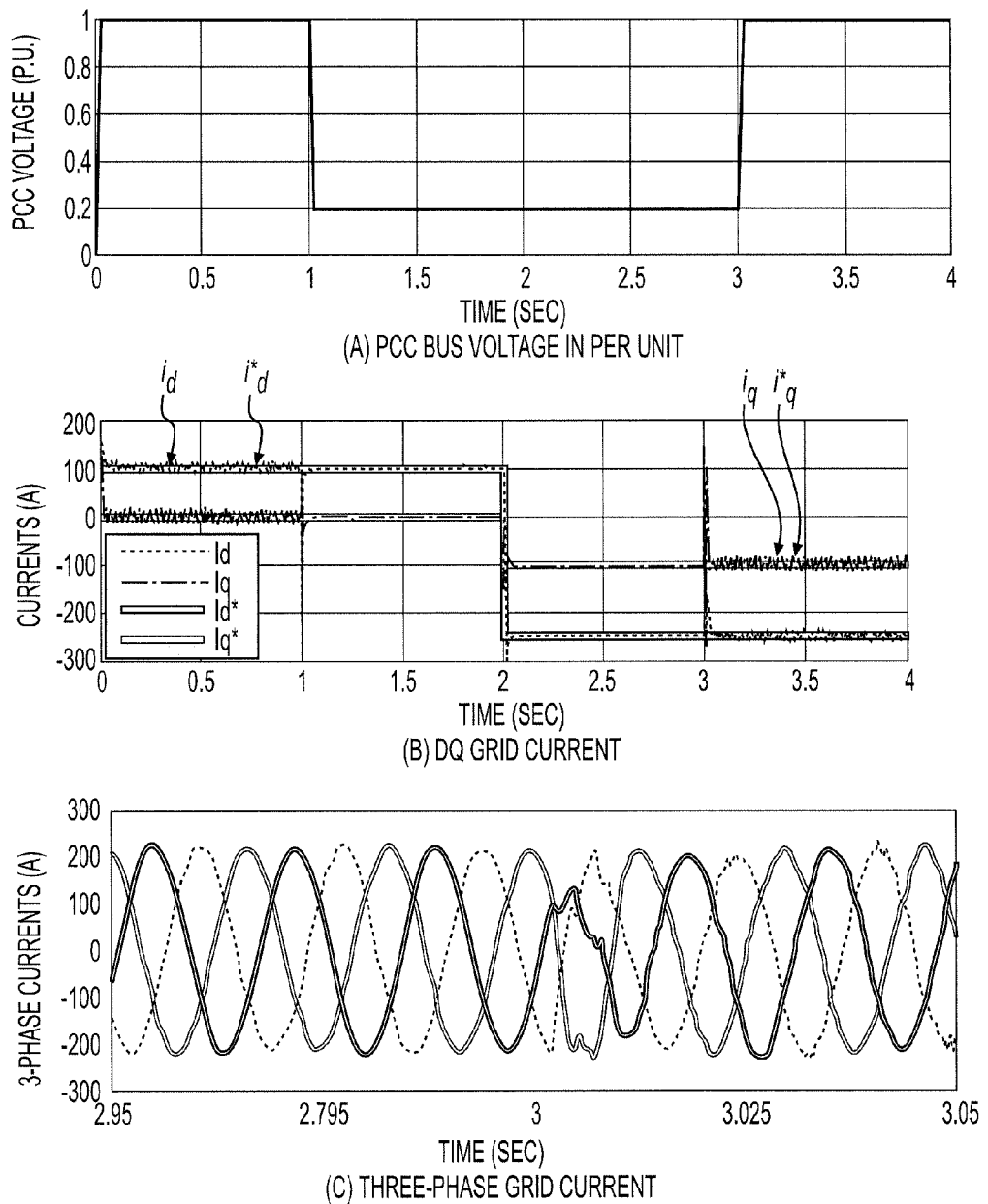
FIGS. 16A-16C are graphs illustrating performance of an example vector control structure using an action neural network where the disturbance voltage is introduced to the output of the action neural network.

Referring now to FIGS. 16A-16C, graphs illustrating performance of an example vector control structure using an action neural network where the disturbance voltage is introduced to the output of the action neural network are shown. In particular, FIGS. 16A-16C illustrate how the example vector control structure responds during short-circuit ride through. These figures also show how the neural vector controller performs under variable PCC voltage caused by a fault. The fault starts at 1 s and is cleared at 3 s, which causes a voltage drop on the PCC bus during this time period, which is shown in FIG. 16A, depending on the fault current levels. As shown in FIG. 16B, the neural vector controller can still effectively regulate the dq current even under a voltage drop of more than 80% caused by a fault, demonstrating strong short-circuit ride-through capability of the neural vector controller. As shown in FIG. 16B, at the start and end of the fault, there is a high peak in the dq current. It should be understood that these peaks do not mean a high grid current but represent a rapid transition from the previous three-phase current state to a new one as shown in FIG. 16C.

Figure 17:
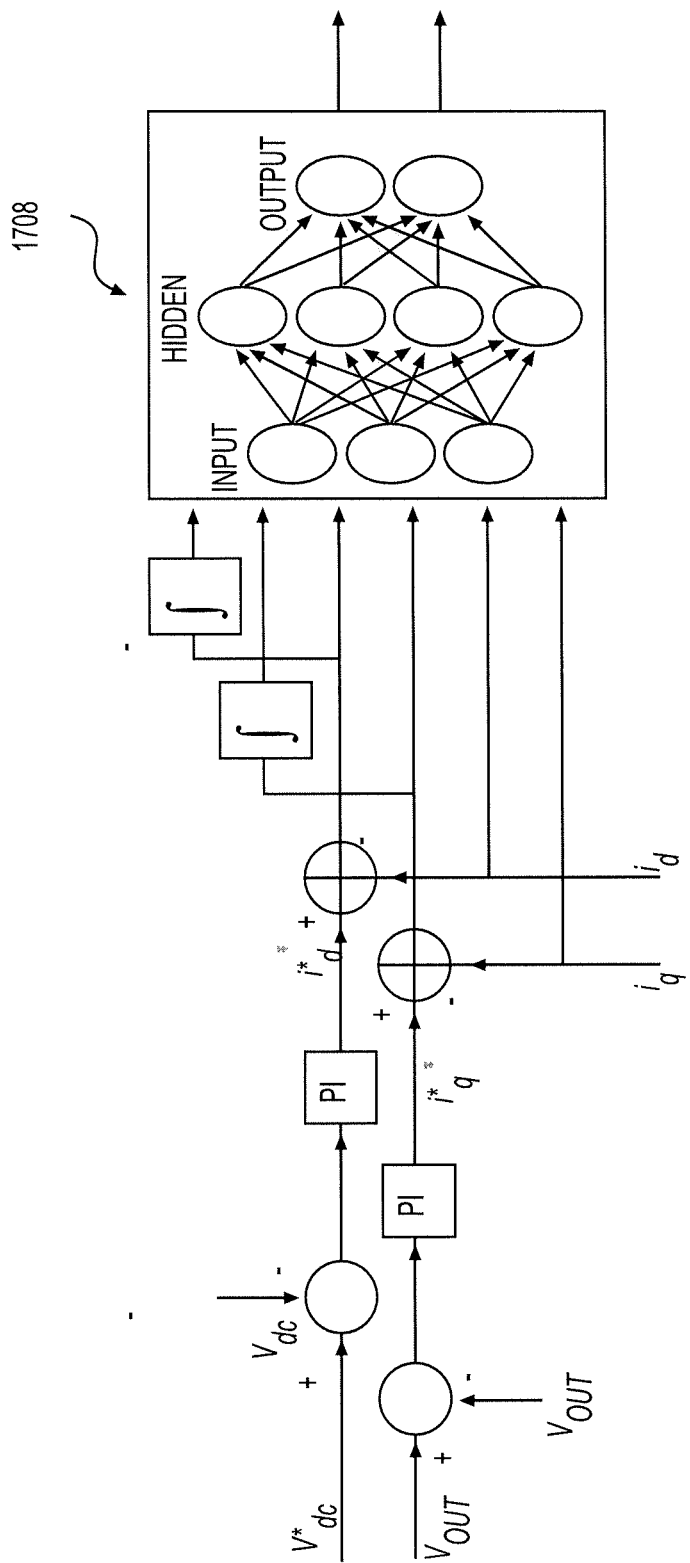
FIG. 17 is a block diagram illustrating a nested-loop grid-connected converter vector control structure.

In many renewable and microgrid applications, the GCC control has a nested-loop structure consisting of a faster inner current loop and a slower outer control loop that generates d- and q-axis current references, $i_d^*$ and $i_q^*$, to the current loop controller. Referring now to FIG. 17, a block diagram illustrating a nested-loop grid-connected converter vector control structure is shown. As discussed above, the d-axis loop is used for DC-link voltage control and the q-axis loop is used for reactive power or grid voltage support control. The error signal between measured and reference dc voltage (e.g., $V_{dc} - V_{dc}^*$) generates a d-axis reference current (e.g., $i_d^*$), which is input to an action neural network 1708 through a PI controller. The error signal between actual and desired reactive power (e.g., $V_{bus} - V_{bus}^*$) generates a q-axis reference current (e.g., $i_q^*$), which is input to an action neural network 1708 through a PI controller.

Figure 1:
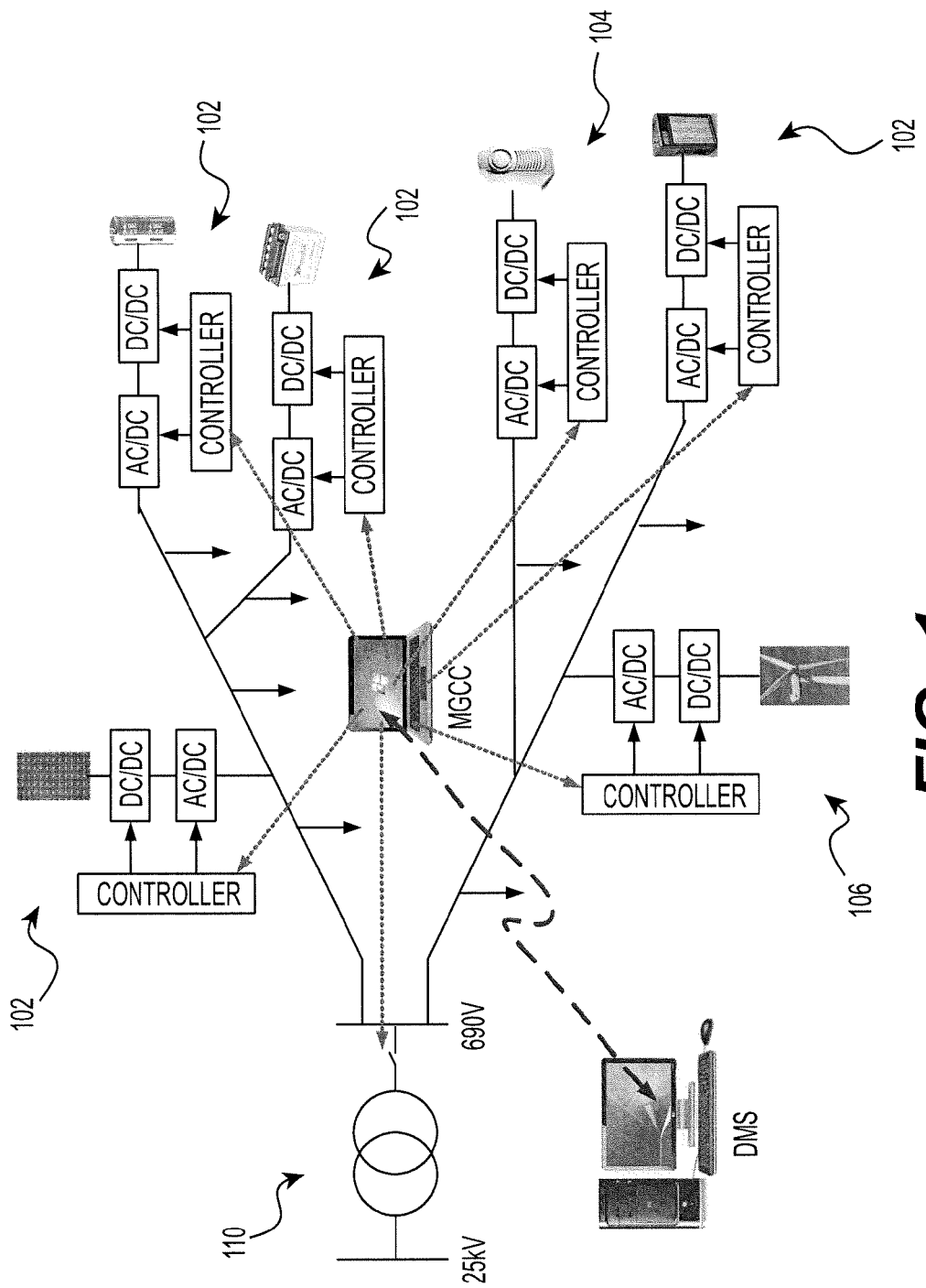
FIG. 1 is a block diagram illustrating grid-connected rectifiers/inverters in a micro-grid to connect distributed energy resources.
Figure 18:
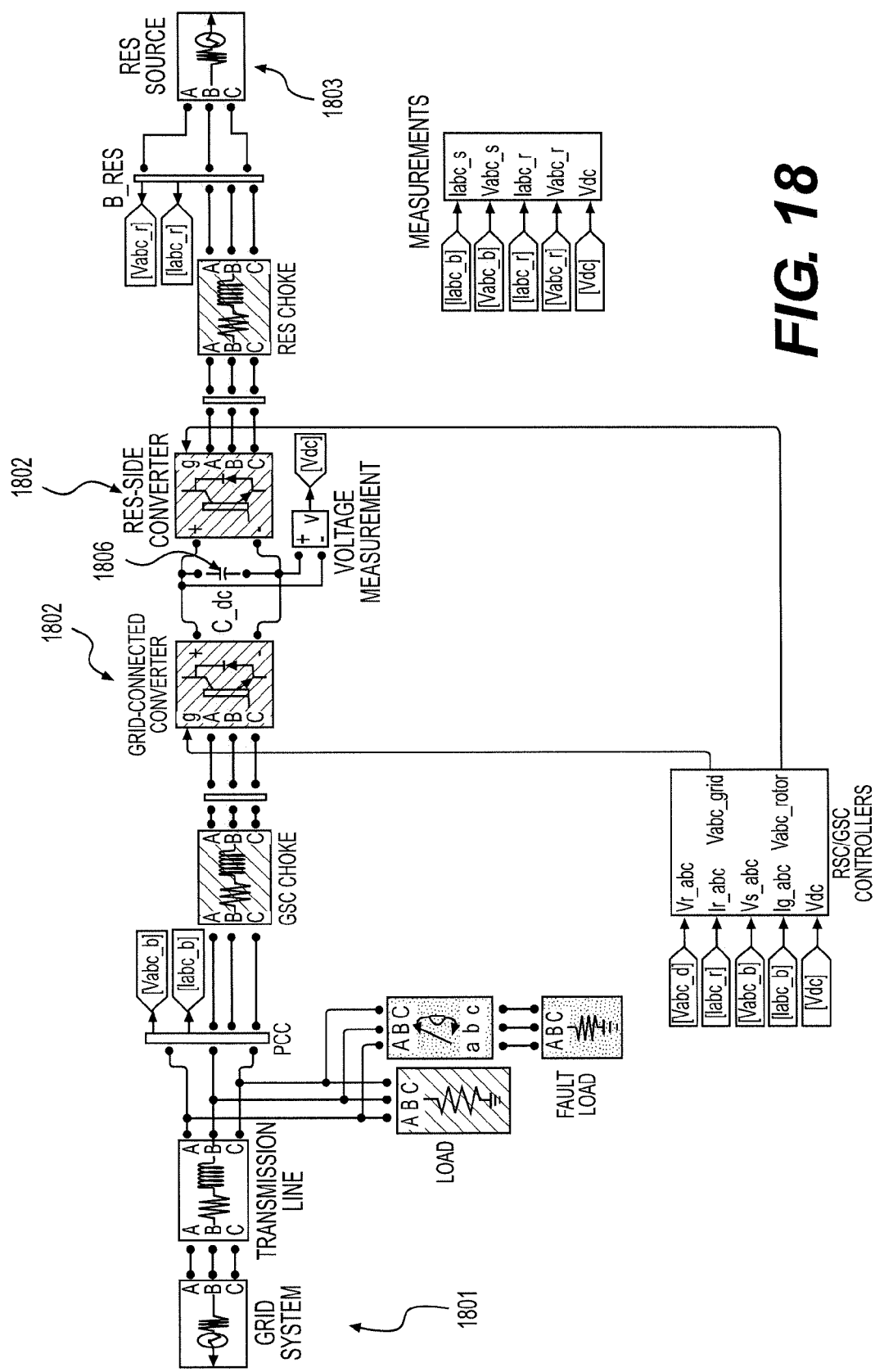
FIG. 18 is a block diagram of a neural vector controller in a AC/DC/AC converter structure.

Referring to FIG. 18, a block diagram of a neural vector controller in a AC/DC/AC converter structure is shown. This configuration can be used for grid integration of distributed energy resources, which are shown in FIG. 1. In FIG. 18, the left side 1801 represents the electrical grid and the right side 1803 represents an RES, such as a wind turbine, for example. Each of the RES and the electrical grid are operably connected to a power converter 1802 (e.g., a grid-side converter and an RES-side converter). Additionally, the power transfers from the RES through a DC-link capacitor 1806 and the grid-side converter 1802 to the electrical grid. It should be understood that the grid-side converter 1802 can be a grid-connected PWM converter (e.g., the GCC) as described herein.

Figure 19:
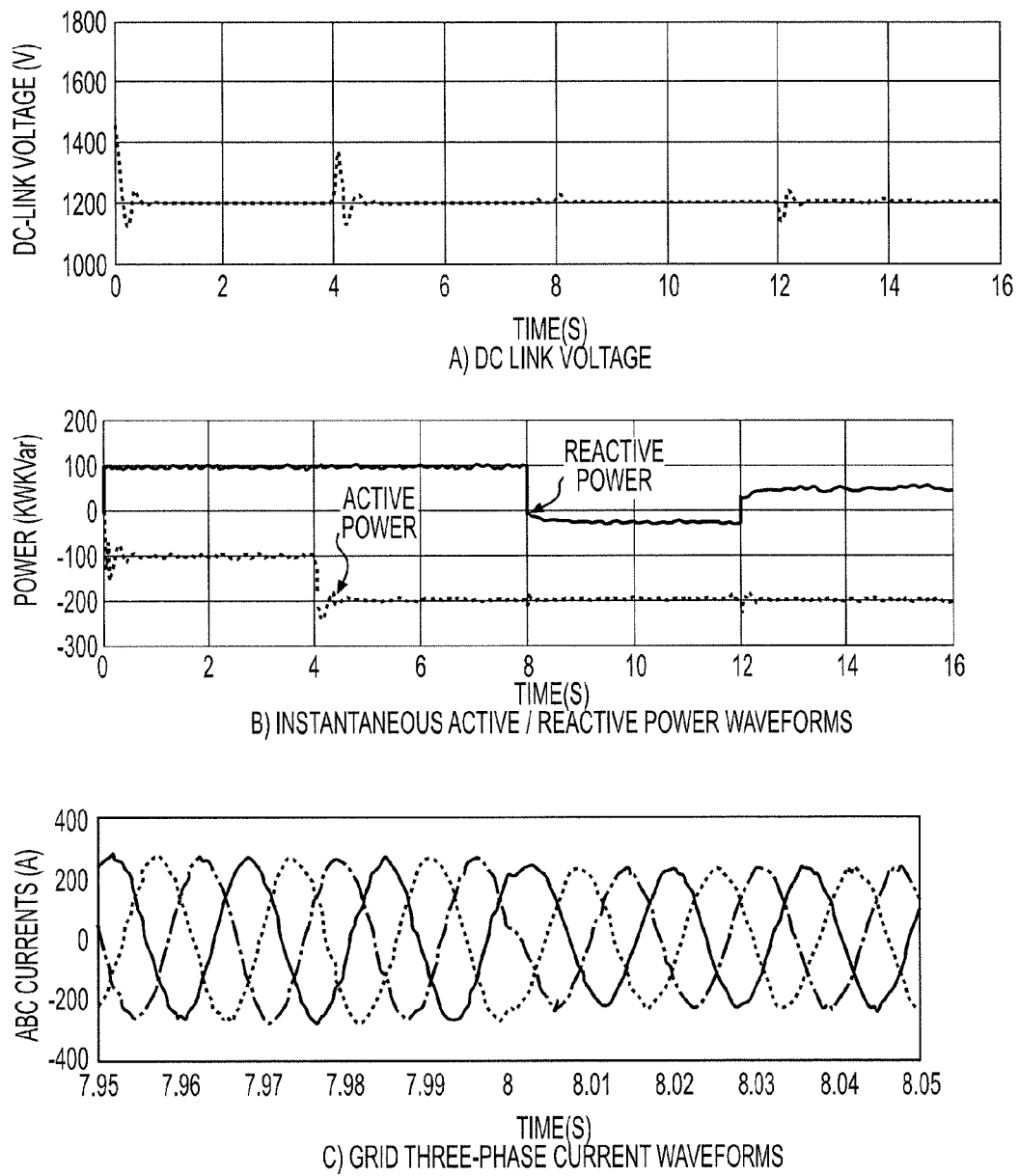
FIGS. 19A-19C are graphs illustrating performance of a neural vector controller in a nested-loop condition.

Referring now to FIGS. 19A-19C, graphs illustrating performance of a neural vector controller in a nested-loop condition are shown. FIG. 19A illustrates the DC-link voltage over time. FIG. 19B illustrates instantaneous active/reactive power waveforms over time. FIG. 19C illustrates the electrical grid three-phase current waveforms over time.

Before t=4 s, the RES generates an active power of 100 kW while the GCC reactive power reference is 100 kVar, i.e., the GCC should absorb reactive power from the electrical grid. The initial DC-link voltage is 1200V. Although no synchronization control is employed at the start of the system, both the DC-link voltage and the GCC reactive power are adjusted around the reference values quickly and have very small oscillations by using the neural network control. At t=4 s, the active power generated by the RES changes to 200 kW, which causes more active power delivered to the electrical grid through the DC-link and the GCC. The reactive power reference is unchanged. Therefore, the DC-link voltage increases. But, with the action neural network vector control, the DC-link voltage is quickly regulated around the reference value. At t=8 s, the reactive power reference changes from 100 kVar to −25 kVar, i.e., the GCC should generate reactive power to the grid. At t=12 s, the reactive power reference changes from −25 kVar to 50 kVar, i.e., a condition of absorbing reactive power. In general, for all the reference changes, the action neural network controller demonstrates very good performance to meet the nested-loop control requirements.

It should be understood that before connecting an energy source to the electrical grid, the energy source should be accurately synchronized with the electrical grid voltage to avoid over currents. The synchronization of most grid-tied systems uses a phase locked loop ("PLL"). Many grid synchronization applications for three-phase systems are based on the implementation of synchronous reference frame PLLs ("SRF-PLL"). In this kind of PLLs, the three-phase grid voltage is transformed using the Clarke and Park transformation into a stationary reference frame. The quadrature component of the voltage resulting from this synchronous transformation, namely, $v_q$, is conducted to zero using a PI controller. The output of the PI controller provides the estimated value of the rotating frequency of the SRF-PLL. The integration of this frequency gives rise to the phase angle of the SRF ($\theta$). When the quadrature component, $v_q$, is equal to zero, $\theta$ matches the phase angle of the input voltage vector, and the PLL is synchronized with the positive-sequence component ("PSC") of the three-phase grid.

Although the SRF-PLL technique presents appropriate performance under balanced voltages, its performance can be highly deficient under unbalanced and distorted grid conditions. Moreover, its performance is very sensitive to sudden changes in the phase angle, which makes it less reliable when synchronizing power converters with the electrical grid.

Figure 20A:
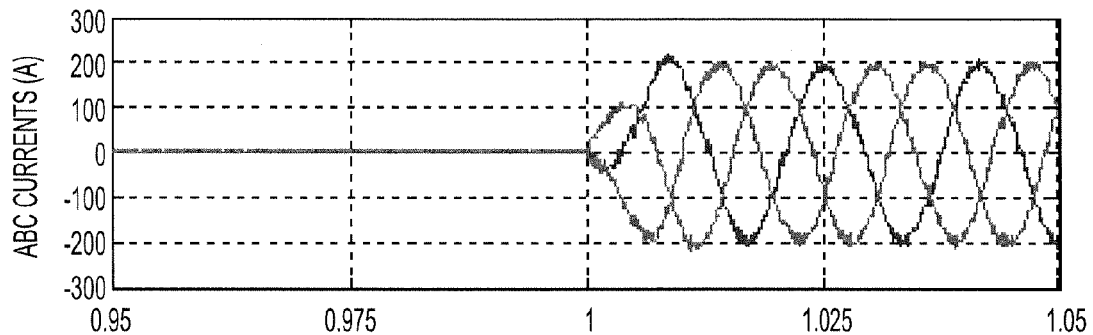
FIGS. 20A-20B are graphs illustrating performance of example neural vector controllers when connected to an electrical grid without pre-synchronization.
Figure 20B:
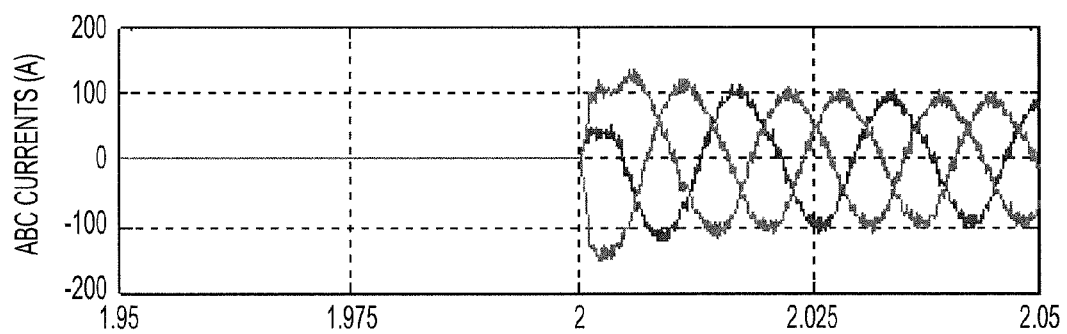

When using the vector controller using an action neural network, this situation is completely different. The neural vector controller can better implement the requirements of an ideal controller with close to zero rise time, zero overshoot and zero settling time. As a consequence, it is possible to connect the GCC interfaced energy sources to the electrical grid by using the neural vector controller directly, without pre-synchronization. FIGS. 20A-20B illustrate performance of example neural vector controllers when connected to an electrical grid without pre-synchronization. In FIGS. 20A-20B, both energy sources are not connected to the electrical grid before t=1 sec. As shown in FIGS. 20A-20B, when the energy sources are connected to the grid at 1 sec and 2 sec respectively, the system gets to the reference power demand of each microsource almost immediately without any over current, demonstrating superior performance of the neural vector controller.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 21:
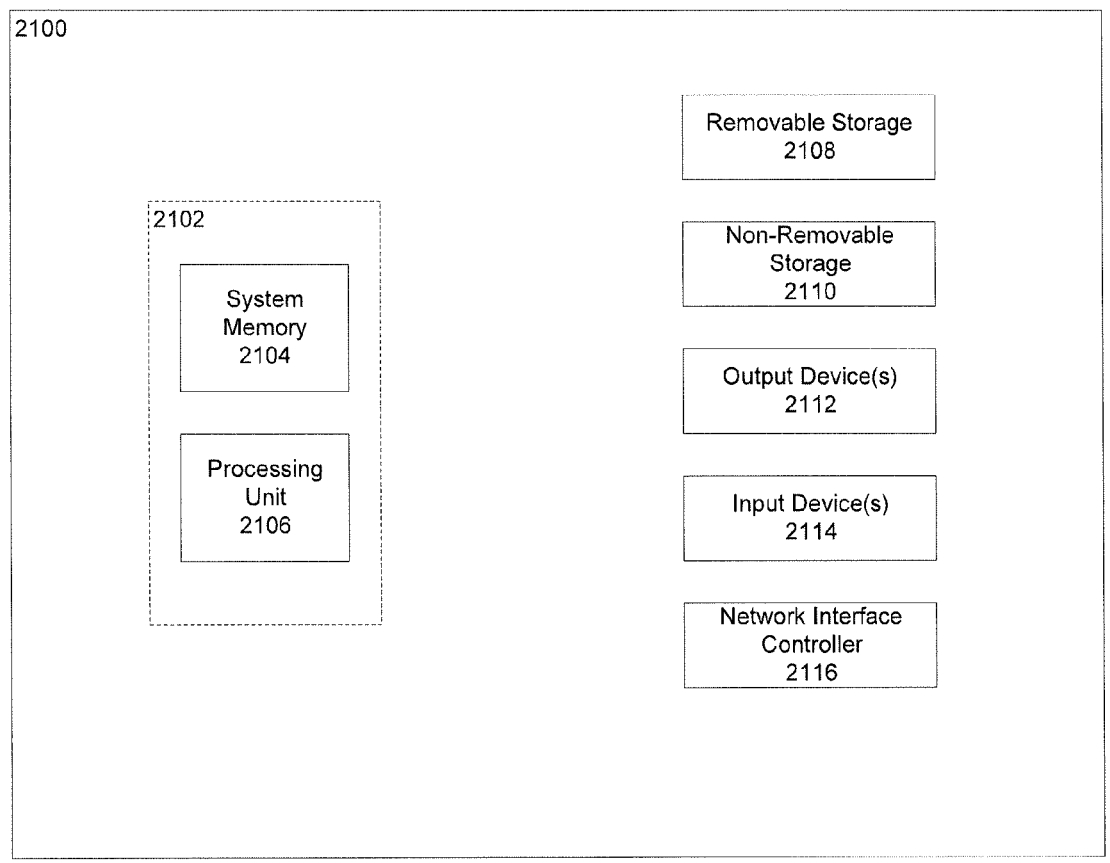
FIG. 21 is a block diagram of an example computing device.

When the logical operations described herein are implemented in software, the process may execute on any type of computing architecture or platform. For example, referring to FIG. 21, an example computing device upon which embodiments of the invention may be implemented is illustrated. The computing device 2100 may include a bus or other communication mechanism for communicating information among various components of the computing device 2100. In its most basic configuration, computing device 2100 typically includes at least one processing unit 2106 and system memory 2104. Depending on the exact configuration and type of computing device, system memory 2104 may be volatile (such as random access memory (RAM)), non-volatile (such as read-only memory (ROM), flash memory, etc.), or some combination of the two. This most basic configuration is illustrated in FIG. 21 by dashed line 2102. The processing unit 2106 may be a standard programmable processor that performs arithmetic and logic operations necessary for operation of the computing device 2100.

Computing device 2100 may have additional features/functionality. For example, computing device 2100 may include additional storage such as removable storage 2108 and non-removable storage 2110 including, but not limited to, magnetic or optical disks or tapes. Computing device 2100 may also contain network connection(s) 2116 that allow the device to communicate with other devices. Computing device 2100 may also have input device(s) 2114 such as a keyboard, mouse, touch screen, etc. Output device(s) 2112 such as a display, speakers, printer, etc. may also be included. The additional devices may be connected to the bus in order to facilitate communication of data among the components of the computing device 2100. All these devices are well known in the art and need not be discussed at length here.

The processing unit 2106 may be configured to execute program code encoded in tangible, computer-readable media. Computer-readable media refers to any media that is capable of providing data that causes the computing device 2100 (i.e., a machine) to operate in a particular fashion. Various computer-readable media may be utilized to provide instructions to the processing unit 2106 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 2106 may execute program code stored in the system memory 2104. For example, the bus may carry data to the system memory 2104, from which the processing unit 2106 receives and executes instructions. The data received by the system memory 2104 may optionally be stored on the removable storage 2108 or the non-removable storage 2110 before or after execution by the processing unit 2106.

Computing device 2100 typically includes a variety of computer-readable media. Computer-readable media can be any available media that can be accessed by device 2100 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 2104, removable storage 2108, and non-removable storage 2110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2100. Any such computer storage media may be part of computing device 2100.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

As discussed above, the performance evaluation demonstrates that the neural vector controller can track the reference d- and q-axis currents effectively even for highly random fluctuating reference currents. Compared to standard vector control techniques and direct-current vector control techniques, the neural vector control approach produces the fastest response time, low overshoot, and, in general, the best performance. In both power converter switching environments and nested-loop control conditions, the neural network vector controller demonstrates strong capability in tracking reference command while maintaining a high power quality. Under a fault in the grid system, the neural vector controller exhibits a strong short-circuit ride-through capability.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling a grid-connected energy source or energy system, comprising:
    providing a grid-connected pulse-width modulated ("PWM") converter operably connected between an electrical grid and an energy source;
    providing a control system operably connected to the grid-connected PWM converter, the control system comprising a nested-loop controller and an action neural network, wherein a d-axis loop of the nested-loop controller controls real power and a q-axis loop of the nested-loop controller controls reactive power;
    receiving a plurality of inputs at the action neural network, wherein the plurality of inputs comprise:
        a d-axis current, $i_d$,
        a q-axis current, $i_q$,
        a d-axis error signal, wherein the d-axis error signal comprises a difference between $i_d$ and a reference d-axis current, $i_d^*$,
        a q-axis error signal, wherein the q-axis error signal comprises a difference between $i_q$ and a reference q-axis current, $i_q^*$,
        an integral of the d-axis error signal, and
        an integral of the q-axis error signal;
    outputting a compensating dq-control voltage from the action neural network, wherein the action neural network is configured to optimize the compensating dq-control voltage based on the plurality of inputs; and
    receiving the compensating dq-control voltage in the nested-loop controller, wherein the control system is configured to control the grid-connected PWM converter using the compensating dq-control voltage.

2. The method of claim 1, wherein the integrals of the d-axis and the q-axis error signals provide the action neural network with a history of the d-axis and q-axis error signals, respectively.

3. The method of claim 1, wherein the action neural network is configured to implement a dynamic programming ("DP") algorithm.

4. The method of claim 3, wherein the action neural network is trained to minimize a cost function of the DP algorithm using a backpropagation through time ("BPTT") algorithm.

5. The method of claim 4, further comprising training the action neural network by:
    randomly generating an initial state comprising an initial dq-current;
    randomly generating a sample reference dq-current;
    unrolling a trajectory of the control system from the initial state; and training the action neural network based on the cost function of the DP algorithm and the BPTT algorithm.

6. The method of claim 1, wherein the action neural network comprises a multi-layer perceptron including a plurality of input nodes, a plurality of hidden layer nodes and a plurality of output nodes.

7. The method of claim 6, wherein the multi-layer perceptron includes six input nodes and two output nodes.

8. The method of claim 6, wherein each of the nodes is configured to implement a hyperbolic tangent function.

9. The method of claim 1, wherein the grid-connected PWM converter is at least one of a DC/AC converter, a DC/DC/AC converter and an AC/DC/AC converter.

10. The method of claim 1, wherein the energy source is at least one of a solar cell or array, a battery, a fuel cell, a wind turbine generator, a capacitor and another electrical grid.

11. The method of claim 1, wherein the control system is configured to control the grid-connected PWM converter under distorted conditions using the compensating dq-control voltage.

12. The method of claim 1, wherein the grid-connected PWM converter is operably connected between the electrical grid and a DC link capacitor.

13. The method of claim 1, wherein the grid-connected PWM converter is operably connected to the electrical grid in a three-phase or single-phase connection.

14. A method for controlling a grid-connected energy system, comprising:
providing a first grid-connected pulse-width modulated ("PWM") converter operably connected between a first electrical grid and a DC link capacitor;
providing a second grid-connected PWM converter operably connected between a second electrical grid and the DC link capacitor;
providing a control system operably connected to at least one of the first and second grid-connected PWM converters, the control system comprising a nested-loop controller and an action neural network, wherein a d-axis loop of the nested-loop controller controls real power and a q-axis loop of the nested-loop controller controls reactive power;
receiving a plurality of inputs at the action neural network, wherein the plurality of inputs comprise:
a d-axis current, $i_d$,
a q-axis current, $i_q$,
a d-axis error signal, wherein the d-axis error signal comprises a difference between $i_d$ and a reference d-axis current, $i_d^*$,
a q-axis error signal, wherein the q-axis error signal comprises a difference between $i_q$ and a reference q-axis current, $i_q^*$,
an integral of the d-axis error signal, and
an integral of the q-axis error signal;
outputting a compensating dq-control voltage from the action neural network, wherein the action neural network is configured to optimize the compensating dq-control voltage based on the plurality of inputs; and
receiving the compensating dq-control voltage in the nested-loop controller, wherein the control system is configured to control the least one of the first and second grid-connected PWM converters using the compensating dq-control voltage.

15. A system for controlling a grid-connected energy source or energy system, comprising:
a grid-connected pulse-width modulated ("PWM") converter operably connected between an electrical grid and an energy source; and
a control system operably connected to the grid-connected PWM converter, the control system comprising a nested-loop controller and an action neural network, wherein a d-axis loop of the nested-loop controller controls real power and a q-axis loop of the nested-loop controller controls reactive power, wherein the action neural network is configured to:
receive a plurality of inputs comprising:
a d-axis current, $i_d$,
a q-axis current, $i_q$,
a d-axis error signal, wherein the d-axis error signal comprises a difference between $i_d$ and a reference d-axis current, $i_d^*$,
a q-axis error signal, wherein the q-axis error signal comprises a difference between $i_q$ and a reference q-axis current, $i_q^*$,
an integral of the d-axis error signal, and
an integral of the q-axis error signal;
optimize a compensating dq-control voltage based on the plurality of inputs; and
output the compensating dq-control voltage to control the PWM converter, wherein the control system is configured to control the grid-connected PWM converter using the compensating dq-control voltage.

16. The system of claim 15, wherein the integrals of the d-axis and the q-axis error signals provide the action neural network with a history of the d-axis and q-axis error signals, respectively.

17. The system of claim 15, wherein the action neural network is configured to implement a dynamic programming ("DP") algorithm.

18. The system of claim 17, wherein the action neural network is trained to minimize a cost function of the DP algorithm using a backpropagation through time ("BPTT") algorithm.

19. The system of claim 18, wherein the action neural network is trained by:
randomly generating an initial state comprising an initial dq-current;
randomly generating a sample reference dq-current;
unrolling a trajectory of the control system from the initial state; and
training the action neural network based on the cost function of the DP algorithm and the BPTT algorithm.

20. The system of claim 15, wherein the action neural network comprises a multi-layer perceptron including a plurality of input nodes, a plurality of hidden layer nodes and a plurality of output nodes, the multi-layer perceptron including six input nodes and two output nodes, each of the nodes is configured to implement a hyperbolic tangent function, and wherein the grid-connected PWM converter is at least one of a DC/AC converter, a DC/DC/AC converter and an AC/DC/AC converter.

* * * * *